US00RE40171E

(19) United States
(12) Reissued Patent
Halasz et al.

(10) Patent Number: US RE40,171 E
(45) Date of Reissued Patent: Mar. 25, 2008

(54) TUBULAR BARREL-SHAPED FLASHLIGHT HAVING ROTATABLE SWITCHING ASSEMBLY AND FOCUSING AND DEFOCUSING CAPABILITY

(75) Inventors: Christopher Lee Halasz, Parker, CO (US); Stephen Sandor Halasz, Parker, CO (US)

(73) Assignee: MAG Instrument, Inc., Ontario, CA (US)

(21) Appl. No.: 10/377,535

(22) Filed: Feb. 27, 2003

Related U.S. Patent Documents

Reissue of:
(64) Patent No.: 6,193,388
Issued: Feb. 27, 2001
Appl. No.: 09/100,527
Filed: Jun. 18, 1998

U.S. Applications:
(63) Continuation-in-part of application No. 09/013,078, filed on Jan. 26, 1998, now Pat. No. 6,354,715.

(51) Int. Cl.
*F21L 4/04* (2006.01)

(52) U.S. Cl. ..... 362/205; 362/187; 362/202; 362/203

(58) Field of Classification Search ..... 362/187, 362/202, 203, 204, 205, 206, 347, 350
See application file for complete search history.

(56) References Cited

U.S. PATENT DOCUMENTS

| | | | |
|---|---|---|---|
| 1,513,211 | A | 10/1924 | Barany |
| 1,584,539 | A | 5/1926 | Hopkins |
| 1,603,272 | A | 10/1926 | Eaton |

(Continued)

FOREIGN PATENT DOCUMENTS

| | | |
|---|---|---|
| AU | 114558 | 1/1942 |
| GB | 549104 | 11/1942 |
| GB | 2 091 863 A | 8/1992 |
| GB | 2 263 162 B | 7/1993 |

*Primary Examiner*—Y. My Quach-Lee
(74) *Attorney, Agent, or Firm*—Jones Day

(57) ABSTRACT

A flashlight in accordance with the present invention includes a chamber, end cap, head assembly and lamp holder assembly. The end cap includes a bowed tripod portion to facilitate standing the flashlight on a flat surface. The head assembly includes a reflector and a lens. In one embodiment of the invention, the head assembly includes an elliptical reflector. In accordance with another embodiment of the present invention, the flashlight having a elliptical reflector is matched with a negative or planar lens. In accordance with another embodiment of the present invention, the head assembly includes an hyperbolic reflector. In accordance with another embodiment of the present invention, the flashlight having a hyperbolic reflector is matched with a positive or planar lens. In accordance with another aspect of the present invention, the flashlight includes electrode connections which prevent the conduction of electrical energy from batteries which are improperly aligned within the flashlight. In another embodiment, the lamp holder assembly includes a lamp socket having a lamp guide which provides a guide for installing lamp bulbs into the lamp socket and also provides a secure position for the lamp bulb. In another embodiment, the lamp holder assembly further includes a fluorescent coating or additive which illuminates light in otherwise dark conditions, thereby facilitating lamp replacement in the less than desirable light conditions. In another embodiment, the flashlight comprises a head assembly attached to the chamber which is rotatable relative to the chamber to cause electrical coupling of a lamp and one or more batteries retained by a chamber. In another embodiment of the flashlight, the spare lamp is held secure by the lamp holder assembly until the user of the flashlight rotates the lamp holder assembly to align a spare lamp opening with the spare lamp.

16 Claims, 36 Drawing Sheets

U.S. PATENT DOCUMENTS

| | | | | |
|---|---|---|---|---|
| 1,608,195 | A | 11/1926 | Barany | |
| 1,638,716 | A | 8/1927 | Surles | |
| 1,644,126 | A | 10/1927 | Harris | |
| 1,674,650 | A | 6/1928 | Leser | |
| 1,680,169 | A | 8/1928 | Osean | |
| 1,680,188 | A | 8/1928 | Weber | |
| 1,758,835 | A | 5/1930 | Hime | |
| 1,823,762 | A | 9/1931 | Rathmann | |
| 1,851,503 | A | 3/1932 | Flamm | |
| 2,016,819 | A | 10/1935 | Meginniss | 240/10.66 |
| 2,097,222 | A | 10/1937 | Tompkins et al. | 240/10.66 |
| 2,173,650 | A | 9/1939 | Fullmer | 240/10.66 |
| 2,176,301 | A | 10/1939 | Haas | 240/10.66 |
| 2,212,103 | A | 8/1940 | Rothenberg et al. | 240/10.69 |
| 2,259,106 | A | 10/1941 | Hager | 200/60 |
| 2,272,907 | A | 2/1942 | Deibel | 240/10.61 |
| 2,338,078 | A | 12/1943 | Wood | 240/10.66 |
| 2,339,356 | A | 1/1944 | Sachs | 240/10.69 |
| 2,396,046 | A | 3/1946 | Hipwell et al. | 240/10.66 |
| 2,490,830 | A | 12/1949 | Norton | 240/10.68 |
| 2,530,913 | A | 11/1950 | Shackel | 240/10.6 |
| 2,599,295 | A | 6/1952 | Thomas | 200/60 |
| 2,915,621 | A | 12/1959 | Garland | 240/10.66 |
| 2,931,005 | A | 3/1960 | Saurwein et al. | 339/182 |
| 2,945,944 | A | 9/1960 | Gillespie | 240/10.68 |
| 3,014,125 | A | 12/1961 | Draudt | 240/10.66 |
| 3,076,891 | A | 2/1963 | Moore | 240/10.66 |
| 3,539,798 | A | 11/1970 | Perry | 240/41.3 |
| 3,652,846 | A | 3/1972 | Starck, II | 240/10.63 |
| 4,114,187 | A | 9/1978 | Uke | 362/158 |
| 4,135,230 | A | 1/1979 | Armbruster | 362/206 |
| 4,151,583 | A | 4/1979 | Miller | 362/205 |
| 4,220,985 | A | 9/1980 | Hakuba | 362/203 |
| 4,286,311 | A | 8/1981 | Maglica | 362/205 |
| 4,388,673 | A | 6/1983 | Maglica | 362/183 |
| 4,398,238 | A | 8/1983 | Nelson | 362/187 |
| 4,399,495 | A | 8/1983 | Leopoldi et al. | 362/189 |
| 4,429,351 | A | 1/1984 | Petzl et al. | 362/187 |
| 4,472,766 | A | 9/1984 | Hung | 362/158 |
| 4,495,551 | A | 1/1985 | Foltz | 362/205 |
| 4,527,223 | A | 7/1985 | Maglica | 362/187 |
| 4,531,178 | A | 7/1985 | Uke | 362/158 |
| 4,570,208 | A | 2/1986 | Sassmannshausen | 362/188 |
| 4,577,263 | A | 3/1986 | Maglica | 362/187 |
| 4,581,686 | A | 4/1986 | Nelson | 362/204 |
| 4,618,081 | A | 10/1986 | Miree | 224/41 |
| 4,656,565 | A | 4/1987 | Maglica | 362/187 |
| 4,658,336 | A | 4/1987 | Maglica | 362/197 |
| 4,722,036 | A | 1/1988 | Hastings | 362/203 |
| 4,725,932 | A | 2/1988 | Gammache | 362/202 |
| 4,733,337 | A | 3/1988 | Bieberstein | 362/206 |
| 4,777,572 | A | 10/1988 | Ambasz | 362/197 |
| 4,777,582 | A | 10/1988 | Sharrah | 362/205 |
| 4,819,141 | A | 4/1989 | Maglica et al. | 362/207 |
| 4,823,242 | A | 4/1989 | Maglica et al. | 362/187 |
| 4,841,417 | A | 6/1989 | Maglica et al. | 362/206 |
| 4,843,526 | A | 6/1989 | Price, III | 362/187 |
| 4,851,974 | A | 7/1989 | Maglica | 362/187 |
| 4,864,474 | A | 9/1989 | Maglica | 362/203 |
| 4,870,550 | A | 9/1989 | Uke | 362/158 |
| 4,875,146 | A | 10/1989 | Drane | 362/202 |
| 4,888,670 | A | 12/1989 | Sharrah | 362/205 |
| 4,899,265 | A | 2/1990 | Maglica | 362/187 |
| 4,907,141 | A | 3/1990 | Wang | 362/205 |
| 4,914,555 | A | 4/1990 | Gammache | 362/183 |
| 4,920,469 | A | 4/1990 | Harding | 362/299 |
| 4,942,505 | A | 7/1990 | Maglica | 362/187 |
| 4,951,183 | A | 8/1990 | Wang | 362/187 |
| 4,956,755 | A | 9/1990 | Maglica et al. | 362/206 |
| 4,967,325 | A | 10/1990 | Shiau | 362/188 |
| 4,984,140 | A | 1/1991 | Ellion | 362/187 |
| 4,999,750 | A | 3/1991 | Gammache | 362/203 |
| 5,043,854 | A | 8/1991 | Gammache | 362/197 |
| 5,113,326 | A | 5/1992 | Maglica | 362/158 |
| 5,122,938 | A | 6/1992 | Pastusek | 362/203 |
| 5,124,894 | A | 6/1992 | Shiau | 362/187 |
| 5,126,927 | A | 6/1992 | Reeves et al. | 362/187 |
| 5,136,491 | A | 8/1992 | Kano | 362/346 |
| 5,138,537 | A | 8/1992 | Wang | 362/187 |
| 5,143,441 | A | 9/1992 | Maglica | 362/263 |
| 5,158,358 | A | 10/1992 | Maglica et al. | 362/206 |
| 5,161,095 | A | 11/1992 | Gammache | 362/197 |
| 5,213,408 | A | 5/1993 | Shiau | 362/187 |
| 5,260,858 | A | 11/1993 | Maglica | 362/205 |
| 5,293,307 | A | 3/1994 | Maglica | 362/203 |
| 5,309,337 | A | 5/1994 | Groben | 362/206 |
| 5,345,370 | A | 9/1994 | Murray et al. | 362/205 |
| 5,349,507 | A | 9/1994 | Parker | 362/158 |
| 5,367,446 | A | 11/1994 | Ellion | 362/184 |
| 5,400,227 | A | 3/1995 | Maglica et al. | 362/206 |
| 5,459,649 | A | 10/1995 | Ellion | 362/187 |
| 5,806,964 | A | 9/1998 | Maglica | 362/203 |
| 6,170,960 | B1 | 1/2001 | Maglica | 362/205 |
| RE38,014 | E | 3/2003 | Bieberstein | 362/206 |

| ECCENTRICITY | VERTEX CURVATURE | EFFECTIVE FOCAL LENGTH | SUBTENDED ANGLE OF LIGHT | MINIMUM SPOT DIAMETER |
|---|---|---|---|---|
| 0.80 | 2.26 | -2.50 | 112 | 33 |
| 0.80 | 2.18 | -3.00 | 108 | 33 |
| 0.80 | 2.08 | -4.01 | 104 | 38 |
| 0.82 | 2.38 | -2.50 | 114 | 31 |
| 0.82 | 2.28 | -3.00 | 109 | 29 |
| 0.82 | 2.17 | -4.01 | 105 | 35 |
| 0.83 | 2.44 | -2.50 | 115 | 30 |
| 0.83 | 2.35 | -3.00 | 110 | 29 |
| 0.83 | 2.22 | -4.01 | 105 | 33 |
| 0.84 | 2.51 | -2.50 | 115 | 31 |
| 0.84 | 2.42 | -3.00 | 111 | 28 |
| 0.84 | 2.29 | -4.01 | 106 | 33 |
| 0.85 | 2.59 | -2.50 | 116 | 28 |
| 0.85 | 2.49 | -3.00 | 112 | 27 |
| 0.85 | 2.35 | -4.01 | 107 | 30 |
| 0.85 | 2.23 | -5.83 | 103 | 35 |
| 0.85 | 2.17 | -8.01 | 101 | 41 |
| 0.88 | 2.69 | -2.50 | 119 | 35 |
| 0.88 | 2.78 | -3.00 | 114 | 29 |
| 0.88 | 2.70 | -3.56 | 112 | 26 |
| 0.88 | 2.70 | -4.01 | 112 | 26 |
| 0.88 | 2.45 | -5.83 | 105 | 29 |
| 0.88 | 2.36 | -8.01 | 103 | 34 |
| 0.90 | 3.05 | -3.00 | 116 | 32 |
| 0.90 | 2.92 | -3.56 | 113 | 28 |
| 0.90 | 2.85 | -4.01 | 111 | 26 |
| 0.90 | 2.65 | -5.83 | 107 | 25 |
| 0.90 | 2.55 | -8.01 | 105 | 30 |
| 0.90 | 2.49 | -19.23 | 104 | 30 |
| 0.91 | 3.23 | -3.00 | 122 | 34 |
| 0.91 | 3.00 | -4.01 | 116 | 26 |
| 0.91 | 2.79 | -5.83 | 110 | 26 |
| 0.91 | 2.66 | -6.01 | 107 | 26 |
| 0.91 | 2.60 | -19.23 | 106 | 28 |
| 0.92 | 3.44 | -3.00 | 118 | 36 |
| 0.92 | 3.19 | -4.01 | 113 | 28 |
| 0.92 | 2.94 | -5.83 | 109 | 25 |
| 0.92 | 2.80 | -8.01 | 109 | 23 |
| 0.92 | 2.73 | -19.23 | 106 | 26 |
| 0.92 | 2.47 | -2E+99 | 101 | 33 |
| 0.93 | 3.42 | -4.01 | 114 | 29 |
| 0.93 | 3.13 | -5.83 | 110 | 27 |
| 0.93 | 2.95 | -8.01 | 108 | 25 |
| 0.93 | 2.89 | -19.23 | 107 | 24 |
| 0.93 | 2.58 | -2E+99 | 102 | 32 |
| 0.94 | 3.73 | -4.01 | 115 | 35 |
| 0.94 | 3.38 | -5.83 | 111 | 29 |
| 0.94 | 3.18 | -8.01 | 109 | 26 |
| 0.94 | 3.09 | -19.23 | 108 | 26 |
| 0.94 | 2.71 | -2E+99 | 103 | 27 |
| 0.95 | 3.70 | -5.83 | 112 | 31 |
| 0.95 | 3.44 | -8.01 | 110 | 28 |
| 0.95 | 3.33 | -19.23 | 109 | 27 |
| 0.95 | 3.00 | -2E+99 | 109 | 26 |
| 0.95 | 2.91 | -2E+99 | 104 | 25 |

FIG.13A

| ECCENTRICITY | VERTEX CURVATURE | EFFECTIVE FOCAL LENGTH | SUBTENDED ANGLE OF LIGHT | MINIMUM SPOT DIAMETER |
|---|---|---|---|---|
| 0.96 | 4.16 | -5.83 | 113 | 35 |
| 0.96 | 3.83 | -8.01 | 110 | 32 |
| 0.96 | 3.68 | -19.23 | 110 | 26 |
| 0.96 | 3.40 | -2E+99 | 107 | 29 |
| 0.96 | 3.07 | -2E+99 | 105 | 25 |
| 0.97 | 4.19 | -19.23 | 110 | 23 |
| 0.97 | 3.60 | -2E+99 | 107 | 30 |
| 0.97 | 3.40 | -2E+99 | 106 | 26 |
| 0.97 | 3.35 | -2E+99 | 106 | 24 |
| 0.98 | 5.20 | -19.23 | 112 | 24 |
| 0.98 | 3.90 | -2E+99 | 107 | 37 |
| 0.98 | 3.80 | -2E+99 | 106 | 25 |
| 0.98 | 3.77 | -2E+99 | 106 | 24 |
| 0.99 | 4.58 | -2E+99 | 107 | 24 |
| 1.00 | 4.10 | -2E+99 | 105 | 30 |
| 1.00 | 5.50 | -2E+99 | 106 | 26 |
| 1.00 | 8.00 | 2E+99 | 102 | 32 |
| 1.00 | 10.00 | 2E+99 | 108 | 45 |
| 1.01 | 4.70 | 2E+99 | 105 | 45 |
| 1.02 | 4.00 | 2E+99 | 103 | 29 |
| 1.03 | 3.60 | 2E+99 | 101 | 26 |
| 1.04 | 3.30 | 2E+99 | 100 | 23 |
| 1.05 | 3.15 | 2E+99 | 98 | 23 |
| 1.06 | 2.95 | 2E+99 | 97 | 24 |
| 1.07 | 2.80 | 2E+99 | 95 | 27 |
| 1.10 | 2.45 | 2E+99 | 92 | 29 |
| 1.10 | 4.25 | 4.93 | 96 | 33 |
| 1.10 | 4.60 | 4.93 | 95 | 24 |
| 1.10 | 4.80 | 4.93 | 96 | 23 |
| 1.10 | 5.50 | 4.93 | 96 | 26 |
| 1.10 | 5.30 | 3.92 | 94 | 33 |
| 1.10 | 6.30 | 3.50 | 93 | 24 |
| 1.15 | 2.15 | 2E+99 | 87 | 25 |
| 1.15 | 3.25 | 4.93 | 92 | 35 |
| 1.15 | 3.85 | 3.92 | 92 | 26 |
| 1.15 | 4.35 | 3.50 | 92 | 22 |
| 1.15 | 5.35 | 3.00 | 91 | 24 |
| 1.15 | 7.20 | 2.47 | 87 | 24 |
| 1.15 | 8.20 | 2.47 | 82 | 26 |
| 1.20 | 3.20 | 3.92 | 91 | 26 |
| 1.20 | 3.55 | 3.50 | 90 | 24 |
| 1.20 | 4.25 | 3.00 | 90 | 24 |
| 1.20 | 6.60 | 2.47 | 87 | 27 |
| 1.25 | 2.80 | 3.92 | 88 | 30 |
| 1.25 | 3.00 | 3.50 | 88 | 27 |
| 1.25 | 3.60 | 3.00 | 88 | 26 |
| 1.25 | 5.25 | 2.47 | 86 | 29 |

FIG.13B

TUBULAR BARREL-SHAPED FLASHLIGHT HAVING ROTATABLE SWITCHING ASSEMBLY AND FOCUSING AND DEFOCUSING CAPABILITY

Matter enclosed in heavy brackets [ ] appears in the original patent but forms no part of this reissue specification; matter printed in italics indicates the additions made by reissue.

This application is a continuation-in-part of application Ser. No. 09/013,078 filed Jan. 26, 1998; now U.S. Pat. No. 6,354,715.

FIELD OF THE INVENTION

The present invention relates to the field of flashlights and more specifically to hand held portable battery operated flashlights.

BACKGROUND OF THE INVENTION

Flashlights generally include a battery chamber having an end cap for retaining one or more batteries, a light bulb electrically connected to the one or more batteries and a reflector for reflecting the light from the light bulb in a particular direction. The electrical connection between the batteries and the light bulb usually includes a switch mechanism for selectively providing electrical energy from the batteries to the light bulb and, therefore enabling the flashlight to be turned on and off. The primary function of flashlights is to provide a convenient portable storable light source which is capable of projecting light in a particular direction.

Some flashlights are capable of focusing and defocusing light projected by the flashlight by allowing the light bulb to be moved within the reflector along the reflector's optical axis. The reflector is typically a parabolic shaped reflector because such a reflector provides a theoretical focus of the light when the light bulb is positioned at the parabolic reflector's focal point. In this regard, light rays emanating from a light bulb positioned at the focal point of a parabolic reflector are reflected parallel to the parabolic reflector's optical axis. Referring to FIG. 1A, a light beam dispersion is shown from a parabolic reflector with a light bulb positioned at the focal point of the parabolic reflector. In contrast, as shown in FIG. 1B, when the light bulb is moved away from the parabolic reflector's focal point, light rays reflected by the parabolic reflector diverge (i.e., defocus) leaving a glaring light void about the center of the reflected light rays and decreasing the light gathered from the light bulb.

The electrical energy to enable a flashlight to operate is usually provided by one battery, or two or more batteries in series arrangement, held within the battery chamber of the flashlight. When the charge in the batteries is depleted, a user will typically replace the batteries by removing the end cap, removing the old batteries from the battery chamber, inserting new batteries into the battery chamber, and replacing the end cap. However, when replacing multiple batteries in a flashlight, the possibility arises that a user may improperly position the batteries in a nonseries arrangement. For example, a user may improperly align the new batteries such that the positive poles of the batteries face each other, or may comingle the old batteries with the new batteries and misalign a new battery with an old battery. Misaligning the batteries may have undesired consequences, for example explosion causing physical injury, to a user of the flashlight.

Additionally, batteries often naturally emit hydrogen gas. As such, when batteries are contained within the flashlight's battery chamber, the possibility arises that hydrogen gas emitted by the batteries may become trapped within the flashlight. In some circumstances, a defective battery will emit high quantities of hydrogen gas. As a consequence, hydrogen gas may accumulate within the flashlight, thus raising the possibility of undesired consequences to a user of the flashlight, for example explosion causing physical injury.

Finally, parts of the flashlight sometimes require replacement. For example, the flashlight's light bulb will require replacement when the light bulb's filament burns out, which is often discovered when the flashlight is needed (e.g., when there are no other sources of light, including for example electrical power outages which occur at night or darkness when camping outdoors). Flashlights usually include a spare light bulb positioned on the interior of the end cap. Replacing a burned out bulb with a bulb positioned on the end cap is difficult, especially in low or no light conditions. For example, during a power outage, replacing the light bulb in a typical flashlight would require a user to remove the end cap, locate and grasp a small spare light bulb on the end cap without allowing the batteries to fall out of the flashlight, replace the end cap, remove the head assembly, replace the burned out bulb and replace the head assembly, all in darkness.

SUMMARY OF THE INVENTION

It is an objective of the present invention to provided an improved flashlight having improved switching and focusing capabilities.

It is another objective of the present invention to provide an improved flashlight which maximizes the light gathered from a light bulb, optimumly focuses the gathered light into a projected light beam and minimizes the light void within the light beam throughout the range of focus.

In accordance with one embodiment of the present invention, an improved flashlight is provided having an end cap, chamber, head assembly and lamp holder assembly. In one embodiment of the invention, the head assembly includes an elliptical reflector to increase the amount of light reflected by the flashlight when a light source is positioned within the elliptical reflector. Preferably, the elliptical reflector has an eccentricity value of no less than about 0.80 and no more than about 0.99. Preferably, the elliptical reflector has a vertex curvature value of no less than about 2.0 and no more than about 5.2. In one arrangement, the elliptical reflector has an eccentricity value of about 0.96 and a vertex curvature of about 3.1.

In accordance with another embodiment of the present invention, a flashlight having an elliptical reflector is matched with either a negative or concave lens, or a flat or planar lens. In this regard, the focusing and light gathering characteristics of the flashlight are optimized when the flashlight's elliptical reflector is matched with a negative or flat lens. Preferably, the flashlight's elliptical reflector is matched with a lens having an effective focal length no, greater than about −2.5". In one arrangement, an elliptical reflector having an eccentricity value of about 0.96 and a vertex curvature of about 3.1 is matched with a lens having an effective focal length of about 0".

In accordance with another embodiment of the present invention, the head assembly includes a hyperbolic reflector to increase the amount of light reflected by flashlight when a light source is positioned within the reflector. Preferably, the hyperbolic reflector has an eccentricity value of no less than about 1.01 and no more than about 1.25. Preferably, the hyperbolic reflector has a vertex curvature value of no less than about 2.0 and no more than about 7.0. In one arrangement, the hyperbolic reflector has an eccentricity value of about 1.04 and a vertex curvature of about 3.3.

In accordance with another embodiment of the present invention, a flashlight having a hyperbolic reflector is matched with either a positive or convex lens, or a flat or planar lens. In this regard, the focusing and light gathering characteristics of the flashlight are increased when the flashlight's hyperbolic reflector is matched with a positive or flat lens. Preferably, the hyperbolic reflector is matched with a lens having an effective focal length no less than about 2.5". In one arrangement, a hyperbolic reflector having an eccentricity value of about 1.04 and a vertex curvature of about 3.3 is matched with a lens having an effective focal length of about 0".

It is another objective of the present invention to provide a flashlight with an improved electrical connection between the batteries and the light source. In accordance with another embodiment of the present invention, the flashlight includes electrode connections which substantially reduce the likelihood that electrical energy will be conducted from batteries which are improperly aligned within the flashlight. In this regard, the electrode connection intended to contact the negative pole of the battery includes a non-conductive portion at the center of the electrode connection and a conductive portion at the perimeter of the electrode connection. As such, in the circumstance wherein a battery is inserted into the flashlight with the positive pole facing the electrode connection, the positive pole will only contact the non-conductive portion, and not the conductive portion, of the electrode connection. Additionally, the electrode connection intended to contact the positive pole of the battery includes a conductive spring having a nonconductive coating. As such, in the circumstance wherein a battery is inserted into the flashlight with the negative pole facing the electrode connection, the negative pole only will contact the nonconductive coated portion.

It is another objective of the present invention to provide a flashlight with a light holder assembly that facilitates lamp bulb replacement. In one embodiment of the present invention, the lamp holder assembly includes a lamp socket having a lamp guide which provides a guide for installing lamp bulbs into the lamp socket and also provides a secure position for the lamp bulb. In accordance with one embodiment of the present invention, the guide facilitates replacing lamps in less than desirable light conditions, as well as protects the lamp from receiving impact shocks when the flashlight is jarred.

It is another objective of the present invention to provide a flashlight capable of maintaining a spare lamp bulb in close proximity to the flashlight's light bulb thus providing for the efficient and easy replacement of the lamp bulb when needed. In accordance with one embodiment of the present invention, the flashlight includes a lamp holder assembly which includes a notch for receiving and holding a spare lamp. As such, a spare lamp is easily accessible by simply removing the head assembly from the chamber and all that is required to replace the lamp bulb, is removal of the lamp bulb in the lamp socket, removing the spare lamp, and inserting the spare lamp into the lamp socket. Preferably, the lamp holder assembly further includes a fluorescent coating or additive which illuminates light in otherwise dark conditions, thereby facilitating lamp bulb replacement in less than desirable light conditions.

In another embodiment, the flashlight comprises a chamber for retaining one or more batteries, a lamp, electrical coupling for holding said lamp and selectively electrically coupling the lamp and one or more batteries, and a head assembly attached to the chamber and rotatable relative to the chamber to cause the electrical coupling to selectively electrically couple the lamp and one or more batteries retained by the chamber. In this regard, the lamp holder assembly moves inside the chamber when the flashlight is turned "off" or "on." The lamp holder assembly includes a lamp holder, a conductive spring, a switch plate, a detent lever, a detent ball a switch contact, a spring contact, a conductive strip, and a strip support. When assembled, the lamp holder assembly is secured axially and rotatable relative to the chamber. The head portion of the flashlight is assembled to the chamber by attaching the assembled head assembly to the chamber such that the lamp is positioned within the first central opening of the reflector. As a consequence, the head assembly is removably attached to the chamber. When fully seated, the head assembly engages the switch plate, and the rotation of the head assembly will cause the lamp holder assembly to rotate. The lamp holder assembly is rotatable among three detents. The first occurs when the head assembly is removed or attached to the chamber. The second occurs when the head assembly is in the "off" position. The third occurs when the head assembly is in the "on" position. The detents are caused by the detent ball being positioned in one of three slots formed on the outer edge of the chamber. As a result, the flashlight is moveable between the "on" and "off" detent positions by the radial movement of the head assembly. The switch contact does not contact the conductive strip in the "off" position. The switch contact contacts the conductive strip in the "on" position. The "on" detent occurs when the detent ball rolls to a second slot on the outer edge of the chamber. Notably, the detent mechanism is physically separated from the switching mechanism.

In another embodiment of the flashlight, the spare lamp is held secure by the lamp holder assembly until the user of the flashlight rotates the lamp holder assembly to align a spare lamp opening with the spare lamp.

BRIEF DESCRIPTION OF THE DRAWINGS

FIGS. 13A and 13B show the results of simulations for a variety of eccentricity values.

DETAILED DESCRIPTION

Figure 6A:
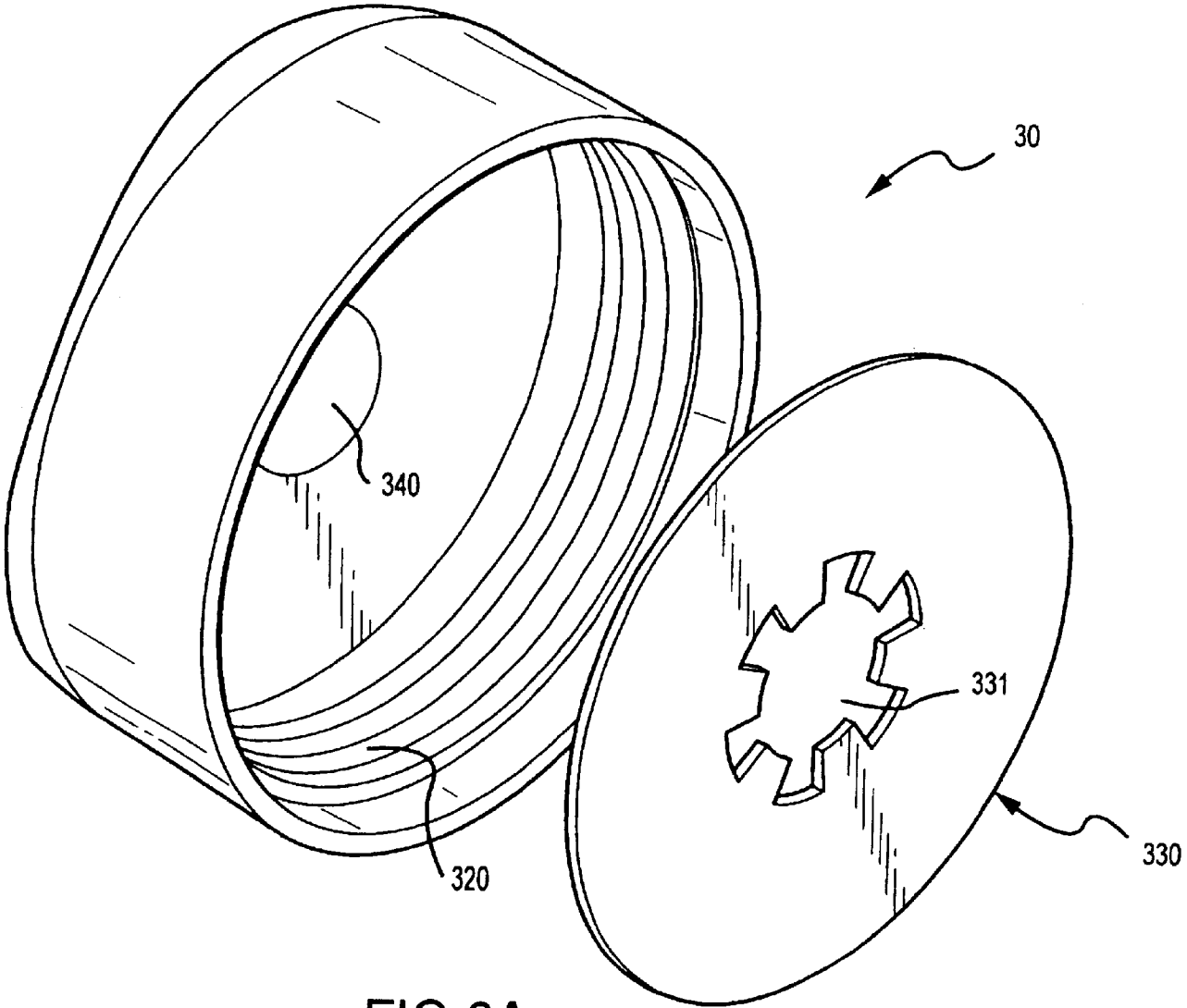
FIG. 6A is an exploded perspective view of the interior of the end cap.
Figure 6B:
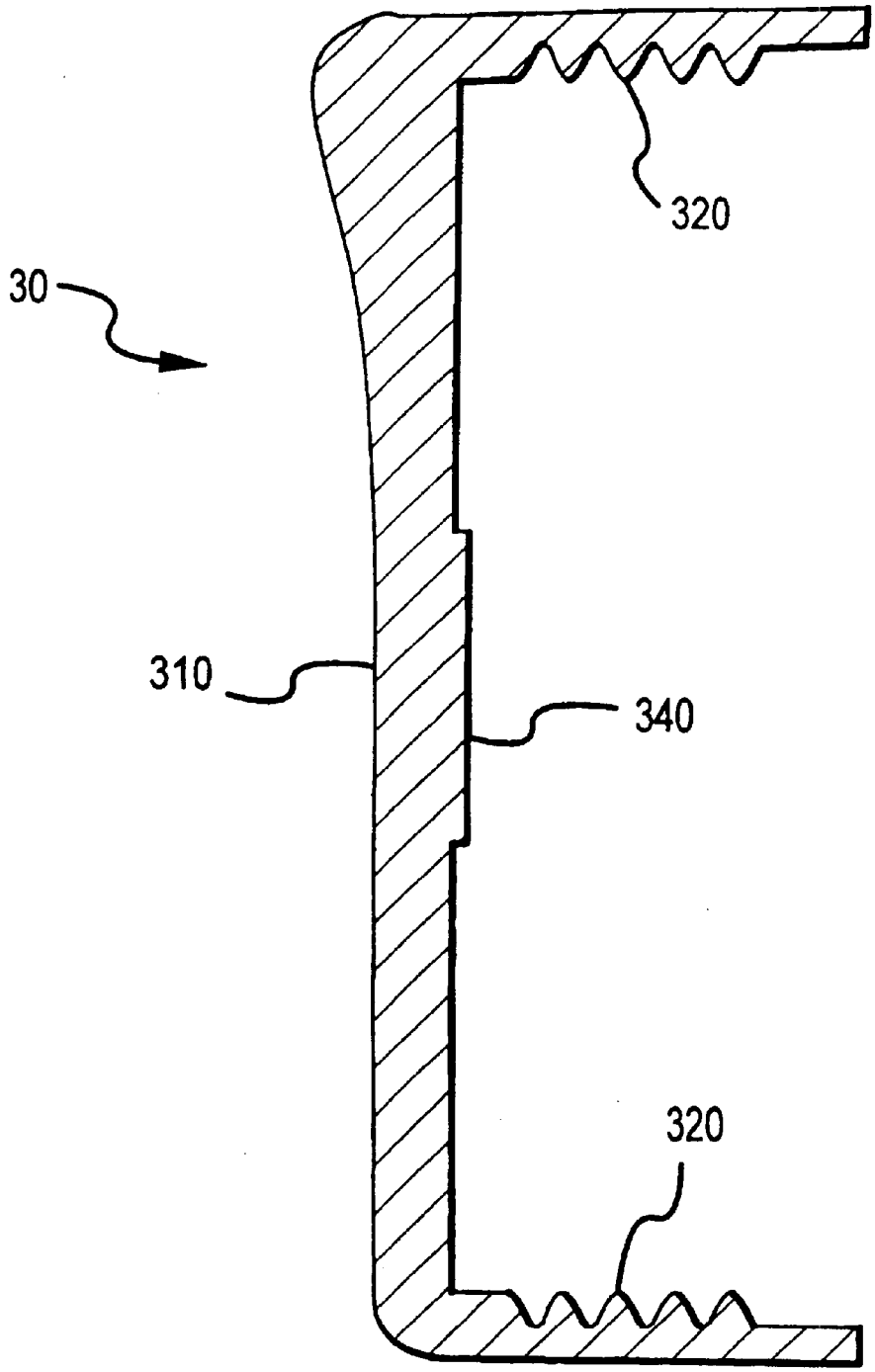
FIG. 6B is a cross-section view of the end cap through the plane indicated by 2-2.
Figure 7A:
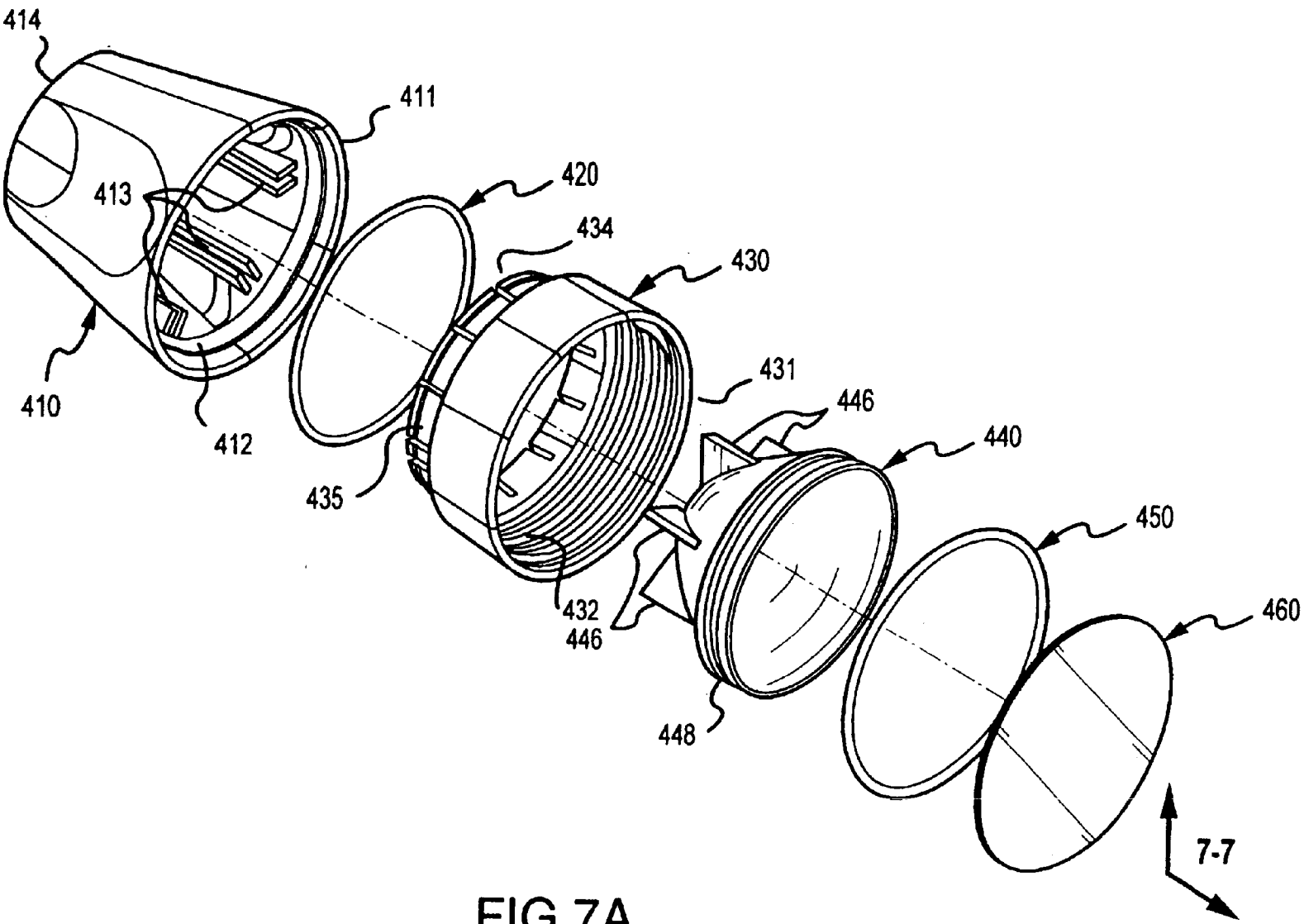
FIG. 7A is an exploded perspective view of the head assembly.
Figure 7B:
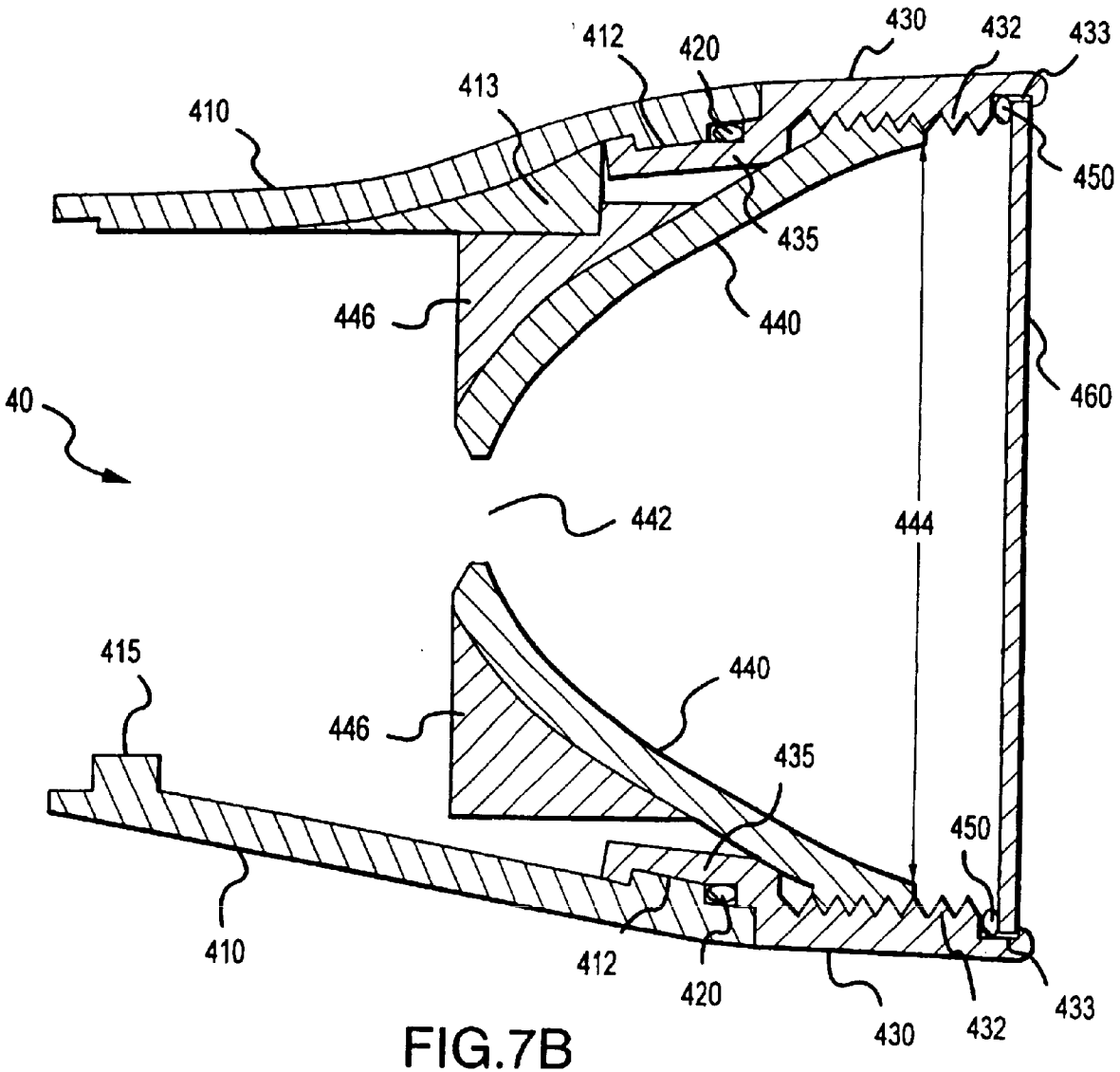
FIG. 7B is a partial cross-section of the head assembly of FIG. 7A as taken through the plane indicated by 7-7.
Figure 8A:
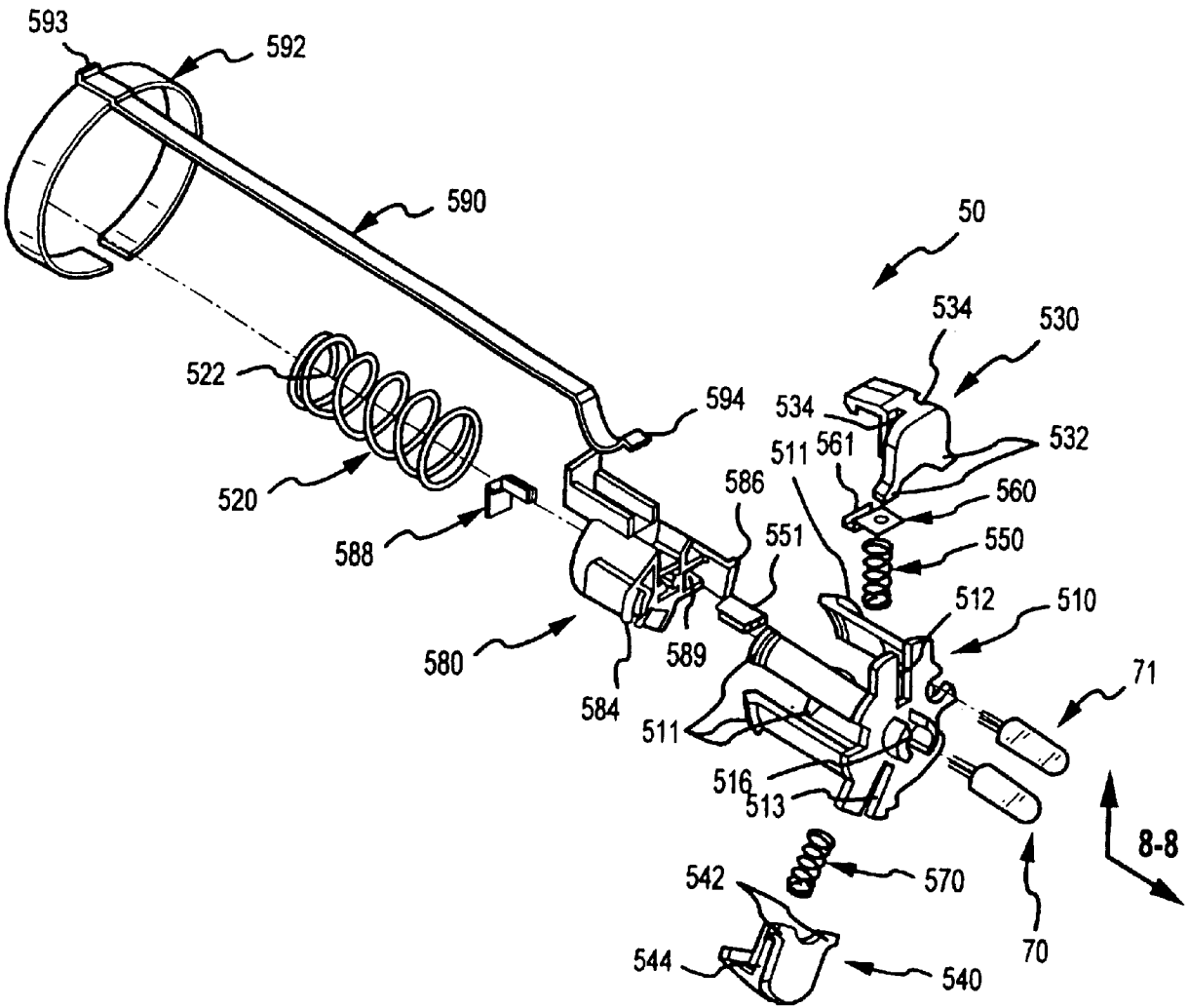
FIG. 8A is an exploded view of the lamp holder assembly.
Figure 8B:
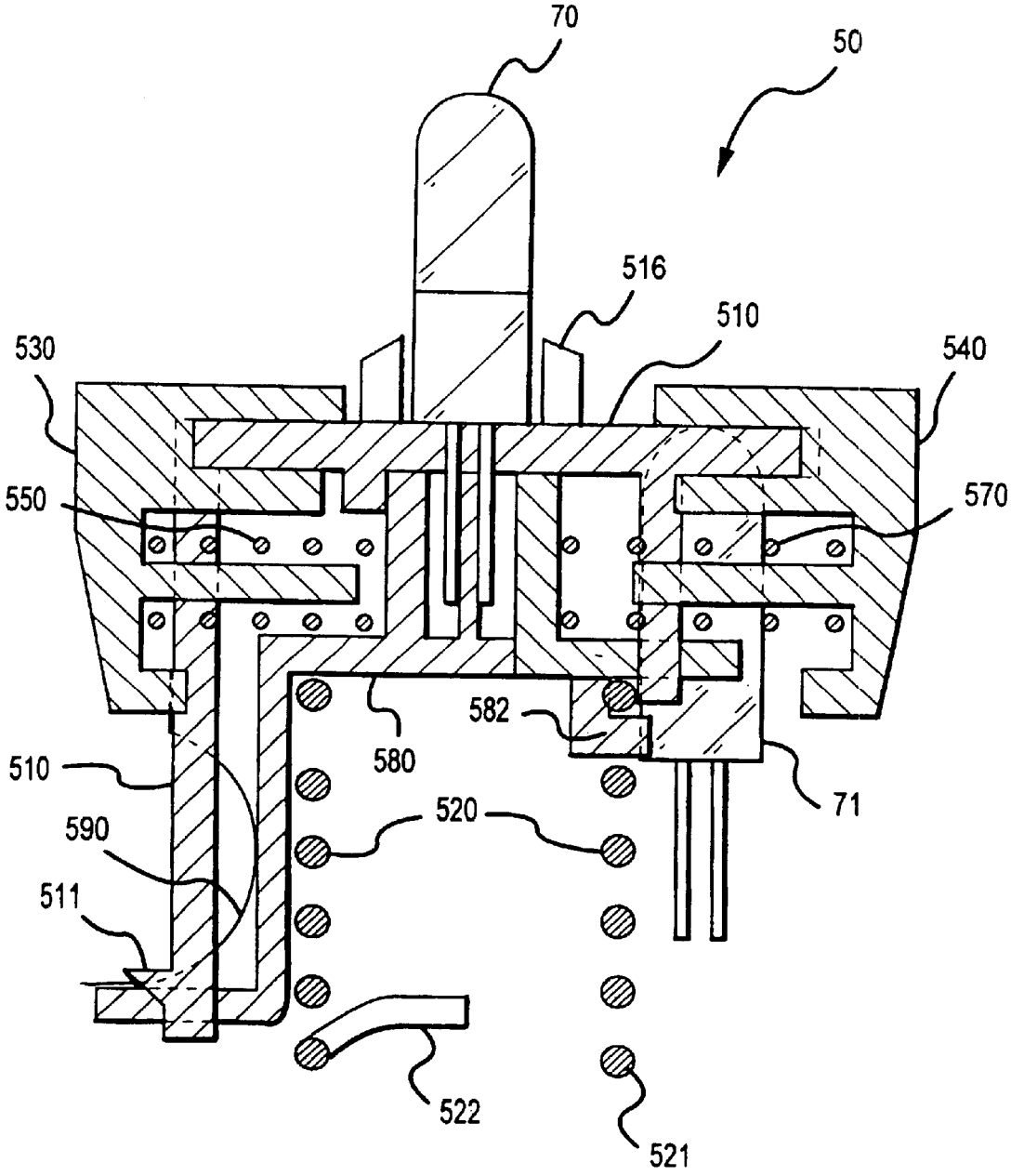
FIG. 8B is a partial cross-section of the lamp holder assembly of FIG. 8A as taken through the plane indicated by 8-8.

Referring to FIGS. 2 through 5, a flashlight 10 in accordance with one embodiment of the present invention is shown having a chamber 20, end cap 30, head assembly 40 and lamp holder assembly 50. The chamber 20 includes an interior portion for holding two batteries 60, 62 in a series arrangement, openings at a first end 210 and a second end 220, a first o-ring 230 positioned at the first end 210, and a second o-ring 240 positioned at the second end 220. Referring additionally to FIGS. 6A and 6B, the end cap 30 includes a bowed tripod portion 310 to facilitate standing the flashlight 10 on a flat surface, interior threads 320 and a conductive disk 330. Referring additionally to FIGS. 7A and 7B, the head assembly 40 includes a head piece 410, a first o-ring 420, a bezel 430, a reflector 440, a second o-ring 450 and a lens 460. The head piece 410 includes a first end 411, a circular tab 412 located within the head piece 410 at the first end 411, guides 413, a second end 414 and lugs 415 located within the head piece 410 at the second end 414. The reflector 440 includes a reflective surface on the reflector's 440 interior, a first central opening 442, a second central opening 444 substantially opposite the first central opening 442, wings 446, and outer threads 448. Preferably, the reflector 440 consists of a durable synthetic material, such as that offered by General Electric Company under the name ULTEM. The bezel 430 includes a first end 431, inner threads 432 at the first end 431 which thread to the reflector's 440 outer threads 448, a recessed circular tab 433 at the first end 431, a second end 434, and a circular tab 435 at the second end 434. The lens 460 is positioned at the perimeter of the first end 431 of the bezel 430. The exterior of the flashlight 10 consists of a metal or durable synthetic material. For example, the exterior of the flashlight 10 can consist of a polycarbonite, or acrylonitrile-butadiene-styrene, or the polycarbonite offered by General Electric Company under the name CYCOLOY.

Figure 5:
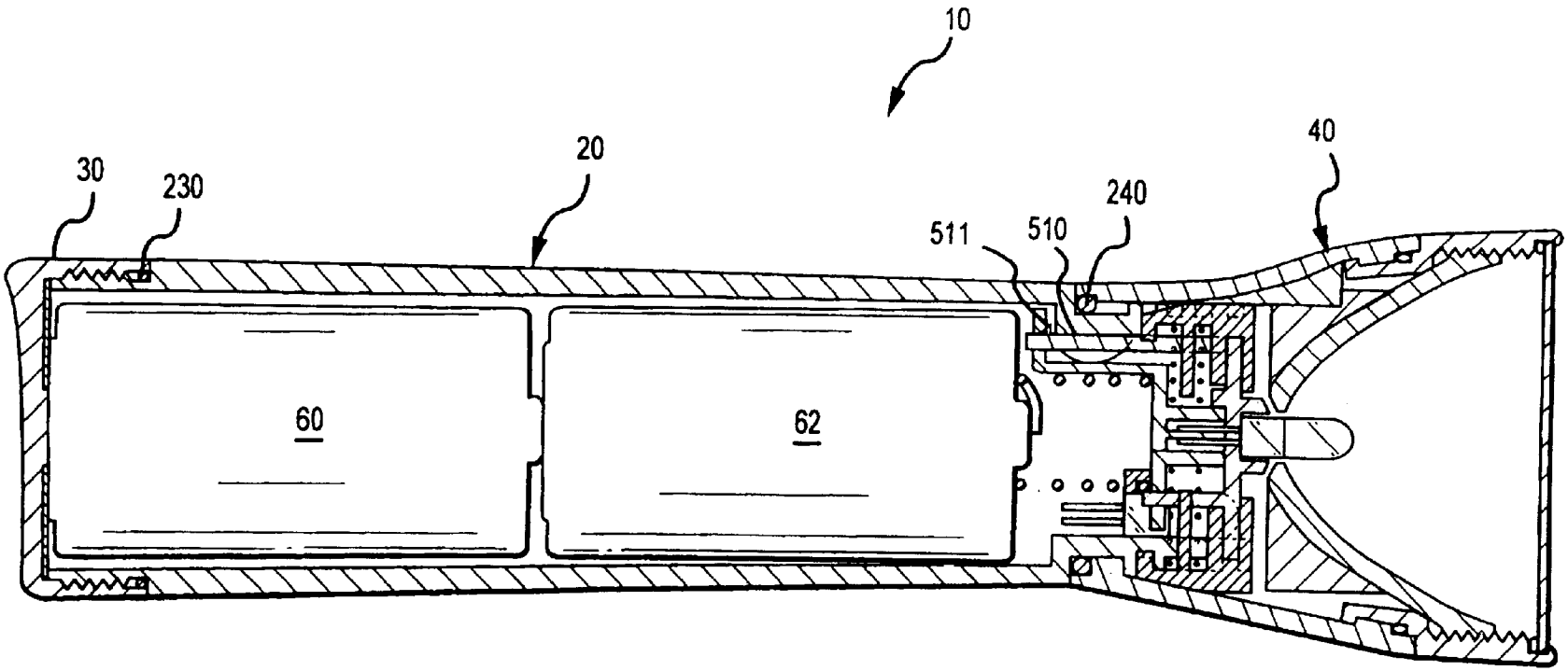
FIG. 5 is a cross-section view of the flashlight down the center of the flashlight of FIG. 2 as taken through the plane indicated by 2-2.

The chamber 20, which is shown in FIG. 5 holding two batteries 60, 62, is enclosed at the first end 210 by the end cap 30 and at the second end 220 by the head assembly 40. Referring to FIGS. 4-8, the end cap 30 is removably attached to the chamber 20 at the first end 210 to selectively uncover the interior portion of the chamber 20 for inserting or removing the batteries 60, 62. In this regard, the chamber 20 includes threading 250 on the exterior surface at the first end 210 of the chamber 20 for engaging the interior threads 320 on the end cap 30. The first o-ring 230 provides a snug attachment when the end cap 30 is threaded to the chamber 20.

Figure 10:
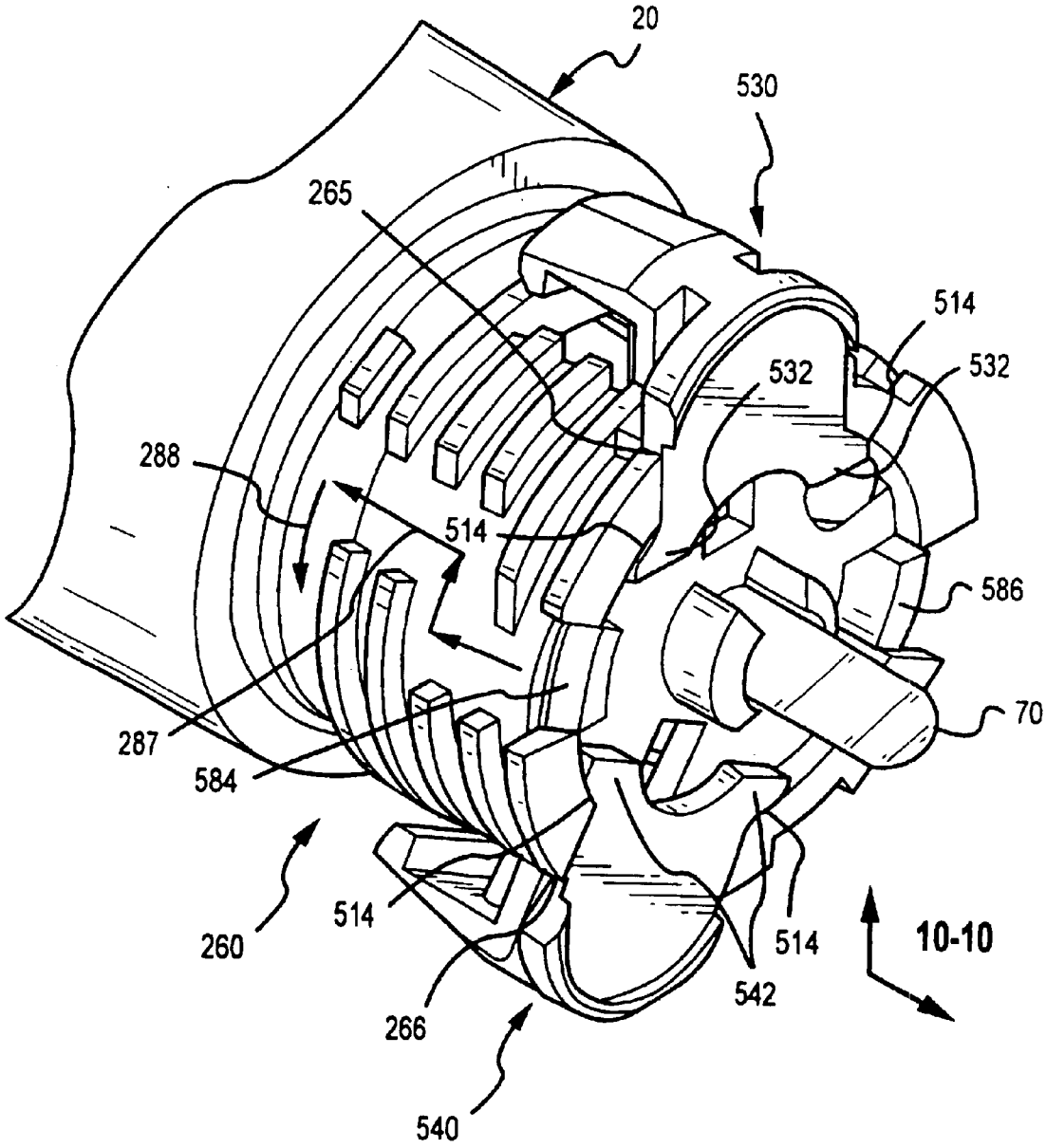
FIG. 10 is a perspective view of the lamp holder assembly positioned within the chamber.

The lamp holder assembly 50 includes two embodiments. In either embodiment, the lamp holder assembly 50 is positioned at the second end 220 of the chamber 20. In the first embodiment, the lamp holder assembly 50 does not move inside the second end 220 of the chamber 20 when the flashlight 10 is turned "off" or "on." In this regard and referring to FIGS. 8A and 8B, the lamp holder assembly 50 includes a lamp holder 510, a conductive spring 520, a switch lever 530, a second lever 540, a switch spring 550, a switch contact 560, a second spring 570, a spring holder 580, a conductive strip 590 and a strip support 592. The spring holder 580 includes a spring tab 582, first tab 584, second tab 586, and a first conductive contact 588. Preferably, the spring holder 580 includes a notch 589 wherein a hydrogen catalyst can be placed to absorb hydrogen gas emitted by the batteries 60, 62. As shown in FIG. 10, when assembled to the chamber 20, the lamp holder assembly 50 does not extend beyond the second end 220 of the chamber 20. Referring to FIGS. 3, 4, 8A, 8B and 10, the lamp holder assembly 50 is assembled to the chamber 20 by first attaching the conductive spring 520 to the spring holder 580. The spring holder 580 includes a spring tab 582 which engages and retains a portion of the conductive spring 520. The spring holder 580 and conductive spring 520 are next attached to the second end 220 of the chamber 20. In this regard, the spring holder 580 includes a first tab 584 and a second tab 586 for engaging the second end 220 of the chamber 20. The chamber 20 includes an end guide 260, and the end guide 260 includes a first recessed tab 262 for engaging the first tab 584, and a second recessed tab 263, for engaging the second tab 586. Referencing FIG. 10, attachment of the spring holder 580 and conductive spring 520 to the second end 220 occurs by inserting the spring holder 580 and attached spring 520 in the first end 210 of the chamber 20 and moving the spring holder 580 toward the second end 220 of the chamber 20 until the first recessed tab 262 engages the first tab 584 and the second recessed tab 263 engages the second tab 586.

The lamp holder 510, with the switch lever 530 and second lever 540 assembled on the lamp holder 510, is next inserted into the second end 220 of the chamber 20. The lamp holder 510 includes tabs 511, a switch slot 512 and a second slot 513. The switch lever 530 includes tabs 532 and slots 534, and the second lever 540 includes tabs 542 and slots 544. The switch lever's 530 slots 534 mate with the switch slot 512 to allow the switch lever 530 to slide along the switch slot 512. The second lever's 540 slots 544 mate with the second slot 513 to allow the second lever 540 to slide along the second slot 513. Referencing FIGS. 3, 5, 8A, 8B and 10, the lamp holder 510 is next partially inserted into the second end 220 of the chamber 20 by aligning the switch slot 512 with the first slotted opening 264 of the end guide 260, and the second slot 513 with the second slotted opening 266 of the end guide 260. Once partially inserted, the switch lever 530 and second lever 540 are spring loaded onto the lamp holder 510 by inserting the switch spring 550 and second spring 570, and aligning and engaging the switch lever's 530 slots 534 with the switch slot 512 and aligning and engaging the second lever's 540 slots 544 with the second slot 513. With the switch lever 540 and second lever 550 depressed, the lamp holder 510 is fully seated into the second end 220 of the chamber 20. As a result, as shown in FIG. 10, the switch lever's 530 tabs 532 and the second lever's 540 tabs 542 engage the chamber 20 at points 514. As shown in FIG. 5, the lamp holder's 510 tabs 511 engage the interior of the chamber 20. Referencing FIGS. 3, 8A and 10, the switch slot 512 engages the recessed tab 265 of the end guide 260 and the second slot 513 engages the recessed tab 267 of the end guide 260. Preferably, the lamp holder assembly 510 snap fits to the chamber 20. Referencing FIG. 11, the lamp holder 510 encloses the spring tab 582, further securing the conductive spring 520 to the spring holder 580. Referencing FIG. 11, the spring holder 580 does not contact the interior of the chamber 20. Referencing FIG. 10, the lamp 70 extends from the second end 220 of the chamber 20 when the lamp 70 is installed into the lamp holder assembly 50.

Referring to FIGS. 7A and 7B, the head assembly 40 is assembled by first inserting the reflector 440 into first end 431 of the bezel 430 and threading the reflector's 440 threads 448 to the bezel's 430 inner threads 432. The second o-ring 450 is next inserted into the circular recessed tab 433 and the lens 460 is fixedly attached to the bezel 430 by pressing the lens 460 into the circular recessed tab 433. The o-ring 450 allows for secure attachment between the lens 460 and the bezel 430. Preferably, the lens 460 snap fits to the bezel 430. The first o-ring 420 is next placed over the circular table 435 at the second end 434 of the bezel 430, and the second end 434 of the bezel 430 is inserted into first end 411 of the head piece 410 with the wings 446 of the reflector 440 aligned with the guides 413 of the head piece 410. When the second end 434 of the bezel 430 is fully inserted into the first end 411 of the head piece 410, the bezel's 430 circular tab 434 engages the head piece's 410 circular tab 412, and the wings 446 of the reflector 440 engage the guides 413 of the head piece 410. As a result, the bezel 430 is only allowed to rotate relative to the head piece 410 (i.e., radially) and cannot move away from the head piece 410 (i.e., axially). Preferably, the bezel 430 snap fits to the head piece 410. As a result of the wings 446 of the reflector 440 engaging the guides 413 of the head piece 410, the reflector 440 moves within the bezel 430 axially when the bezel 430 is moved radially.

Figure 15A:
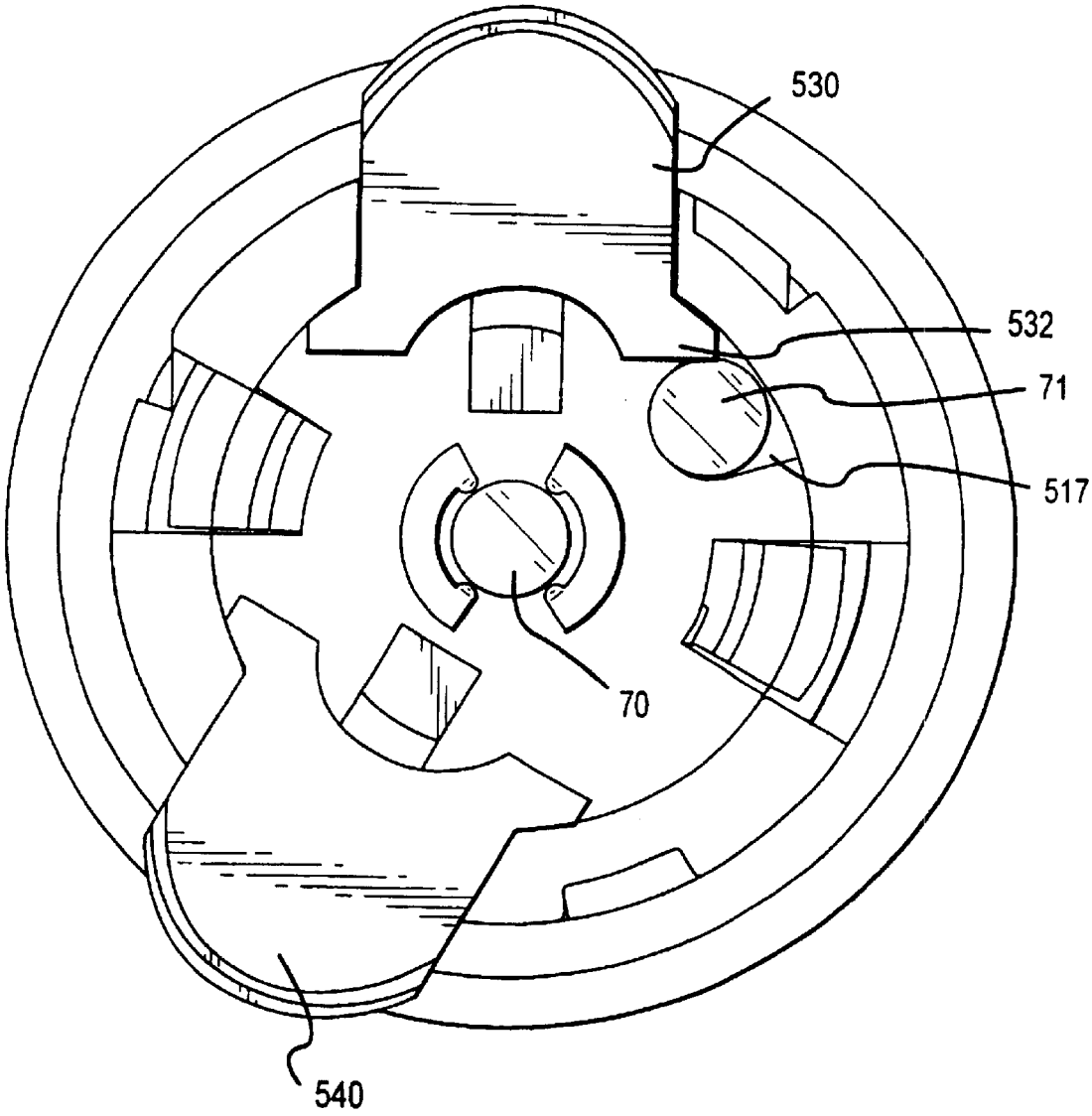
FIG. 15A is a front view of the lamp holder assembly when the head assembly is removed from the chamber.

The head portion of the flashlight 10 is assembled by attaching the assembled head assembly 40 to the chamber 20, having the lamp holder assembly 50 assembled in the chamber 20, such that the lamp 70 is positioned within the first central opening 442 of the reflector 440. In this regard, the head assembly 40 is removably attached to the chamber 20 at the second end 220. FIGS. 10 and 15A show the lamp holder assembly 50 assembled in the chamber 20 when the head assembly is removed from the chamber 20. The chamber 20 includes the end guide 260 formed on the exterior surface at the second end 220 of the chamber 20. Referencing FIGS. 3 and 10, the end guide 260 includes paths 261 which engage the lugs 415 on the head piece 410. The lugs 415 are aligned with paths 261, and the head assembly 40 is guided in the direction 287 until the head assembly 40 is fully seated on the second end 220 of the chamber 20. The head assembly 40 is then rotated in the direction 288 to a first detent, which is caused by the switch lever 530 being positioned between two of the guides 413. The flashlight 10 is in the "off" position at this position. In this position, the head assembly 40 is only permitted to rotate relative to the chamber 20 (i.e., radially) and cannot move away from the chamber 20 (i.e., axially). The second o-ring 240 provides a secure attachment between the head assembly 40 and the chamber 20.

Figure 9A:
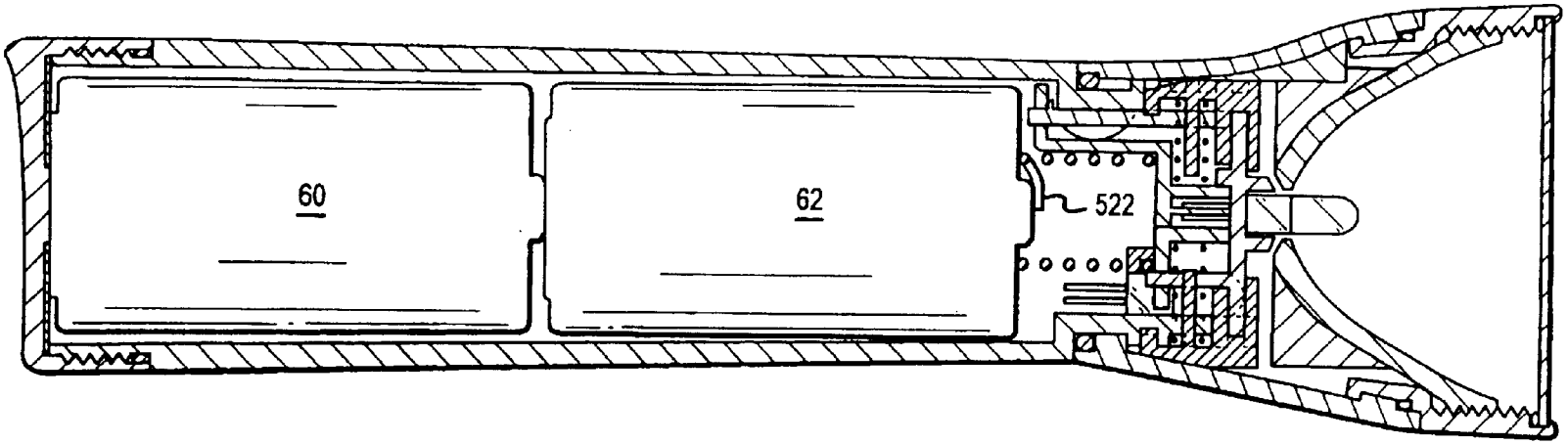
FIGS. 9A and 9B are cross-section views of the flashlight of FIG. 2 as taken through the plane indicated by 2-2 showing aligned and misaligned batteries, respectively.
Figure 9B:
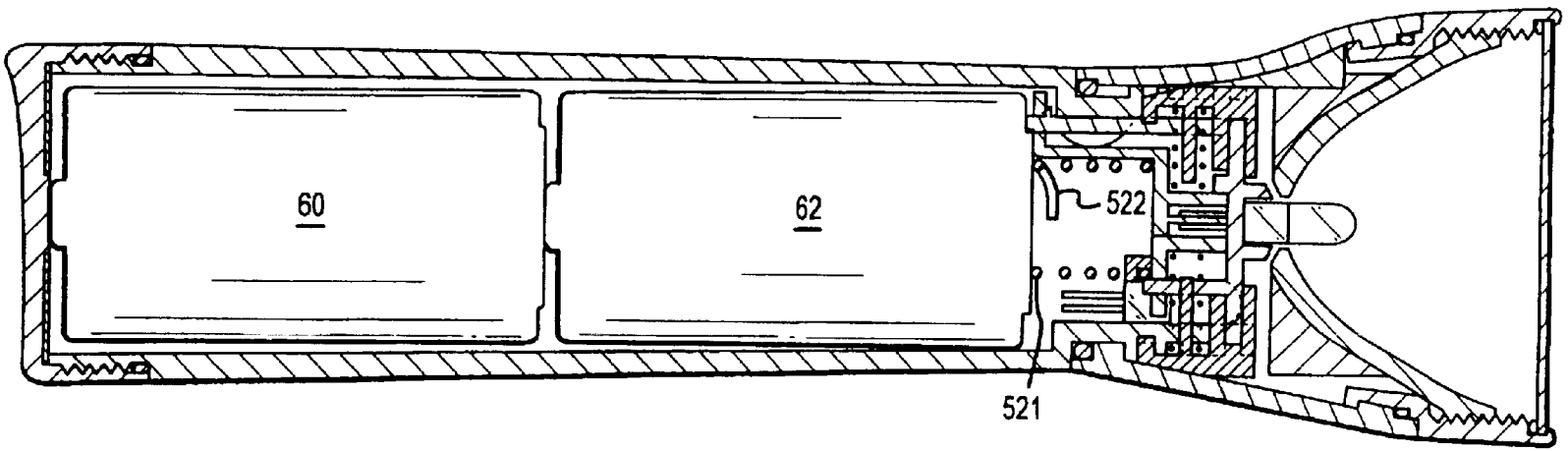

When fully assembled and holding batteries 60, 62 in proper alignment, the flashlight 10 is capable of selectively electrically coupling the lamp 70 to the batteries 60, 62. The chamber 20 includes a conductive strip 590 along the length of the chamber 20, between the first end 210 and the second end 220. The conductive strip 590 is supported at the first end 210 of the chamber 20 by the strip support 592. Referring to FIGS. 6A and 6B, the end cap 30 includes a nonconductive area 340. Referencing FIG. 8, when the end cap 30 is attached to the chamber 20, the conductive disk 330 is electrically connected to the conductive strip 590 at point 593. The conductive disk 330 electrically connects the negative contact of the battery 60 to the conductive strip 590 when the battery 60 is properly aligned in the chamber 20 as shown in FIG. 9A. The nonconductive area 340 prevents electrical connection when the battery 60 is improperly aligned in the chamber 20 as shown in FIG. 9B. In this regard, the positive contact of an improperly aligned battery 60 only contacts the nonconductive area 340 and does not contact the conductive disk 330, due to the opening 331, as shown in FIG. 6A.

The lamp holder assembly 50 selectively electrically connects the lamp 70 to properly positioned batteries 60, 62 in accordance with the radial movement of the head assembly 40. Referencing FIG. 11, the flashlight 10 is shown in the "off" position. Referencing FIGS. 3, 10 and 12, the flashlight 10 is moved to the "on" position by rotating the head assembly 40 in the direction 288. The head portion of the flashlight 10 can be disassembled by rotating the head assembly 40 from the "off" position in a direction opposite 288 and disengaging the head assembly 40 from the chamber 20 along paths 261.

Figure 11:
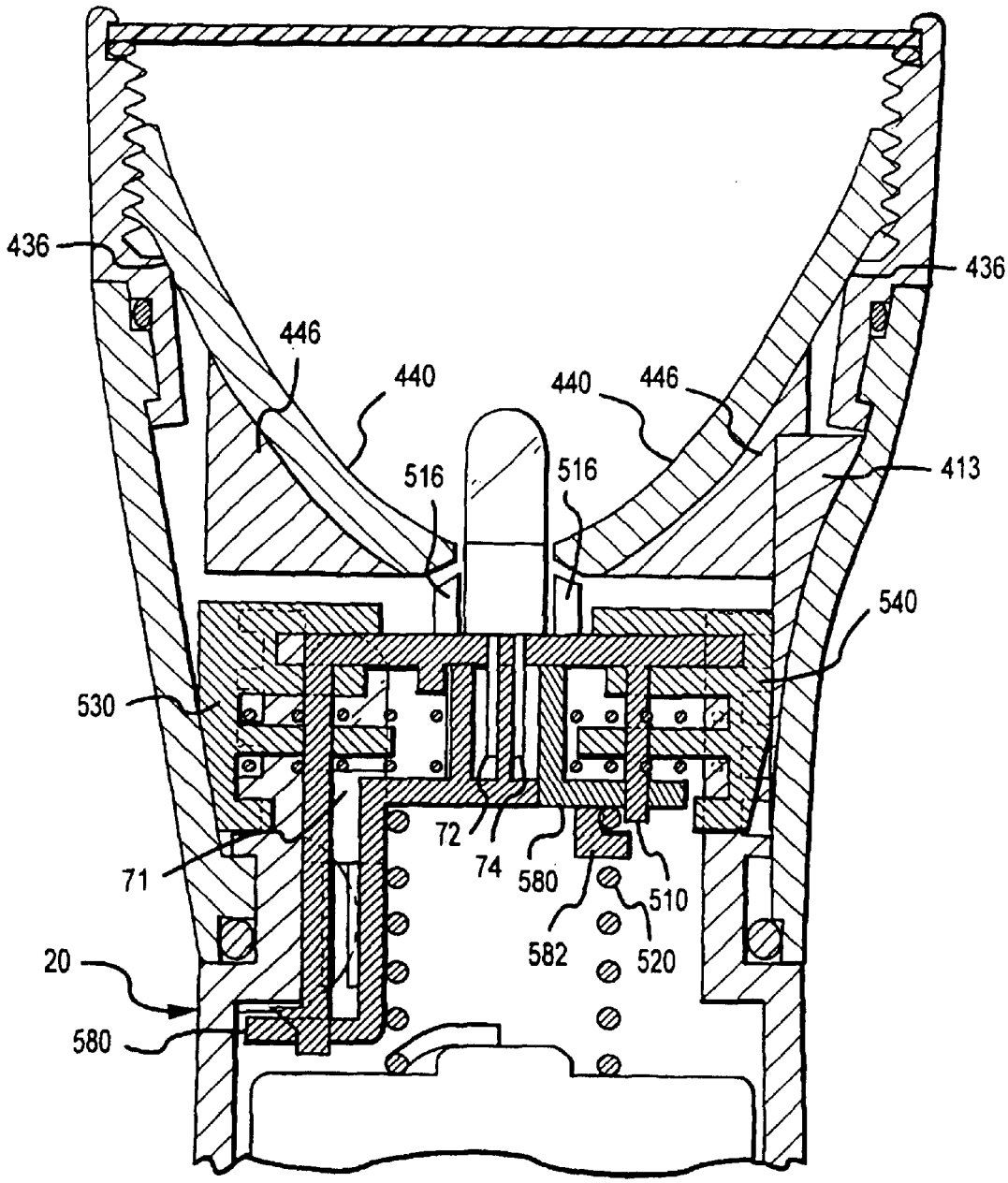
FIG. 11 is partial cross-section of the head portion of the flashlight of FIG. 2, as taken through the plane indicted by 2-2, showing the flashlight in the "off" position.

Referring to FIGS. 8-12, 14A, 14B, 14C and 15, the 510 includes a lamp socket 515 for holding a lamp 70 having a first pin 72 and second pin 74 and a lamp guide 516. When the head portion of the flashlight 10 is assembled, the lamp guide 516 does not contact the reflector 440. In this regard, the reflector 440 is prevented from contacting the lamp guide 516 by stop 436 as shown in FIG. 11. The lamp guide 516 is a guide which facilitates aligning the first pin 72 and second pin 74 of the lamp 70 with the lamp socket 515 when the lamp 70 is being installed. The lamp guide 516 also provides a secure position for the lamp 70 by supporting a part of the outer portion of the lamp 70 when the lamp 70 is installed. As such, the lamp guide 516 facilitates replacing a lamp 70 in less than desirable light conditions, as well as protects the lamp 70 from receiving impact shocks from the reflector 440 when the flashlight 10 is jarred. Additionally, the lamp holder 510 is capable of receiving and holding a spare lamp 71. In this regard, the lamp holder 510 includes a notch 517 which is capable of receiving a spare lamp 71.

Figure 15B:
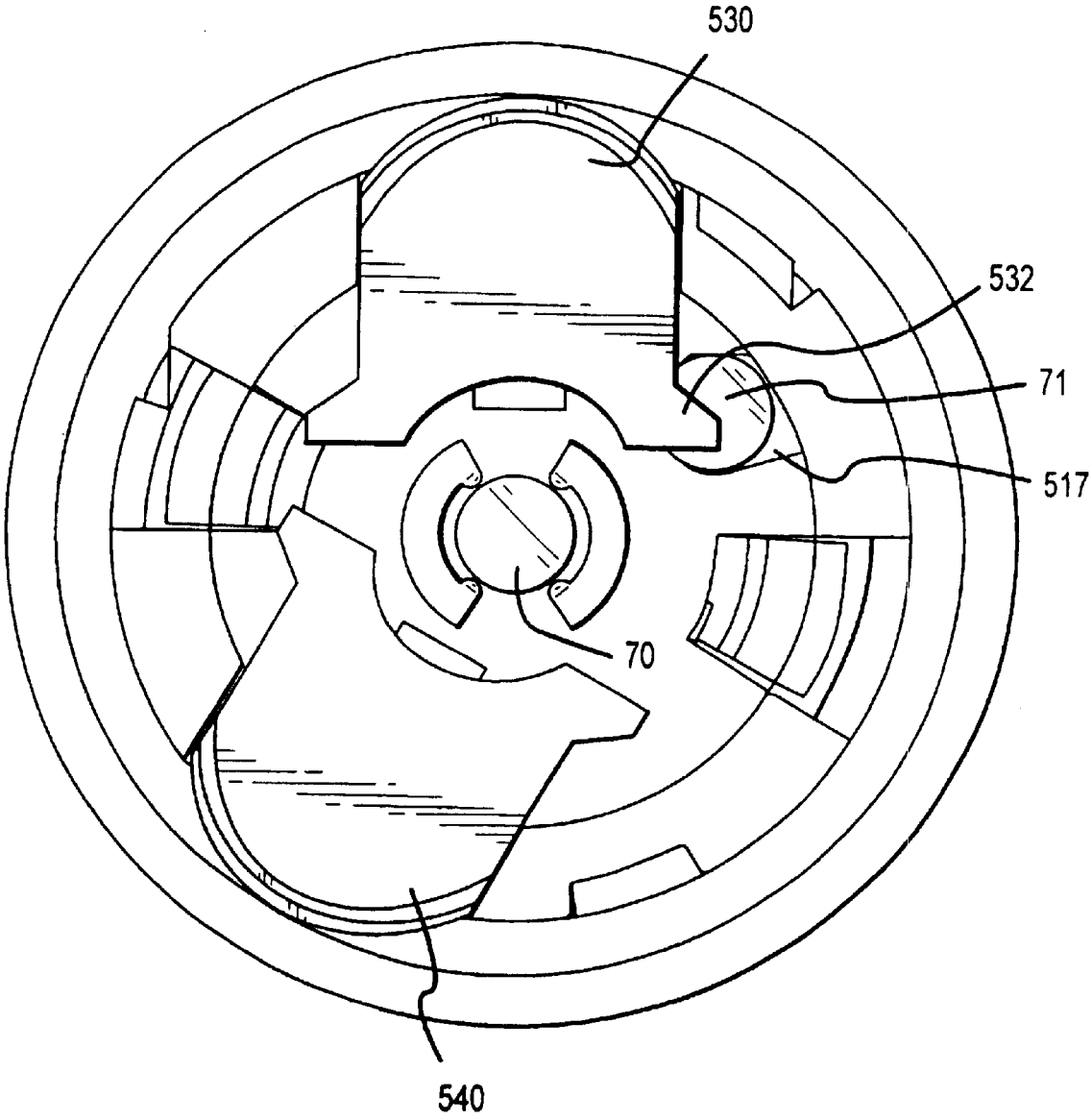
FIG. 15B is a front view of the lamp holder assembly when the head assembly is attached to the chamber.
Figure 16:
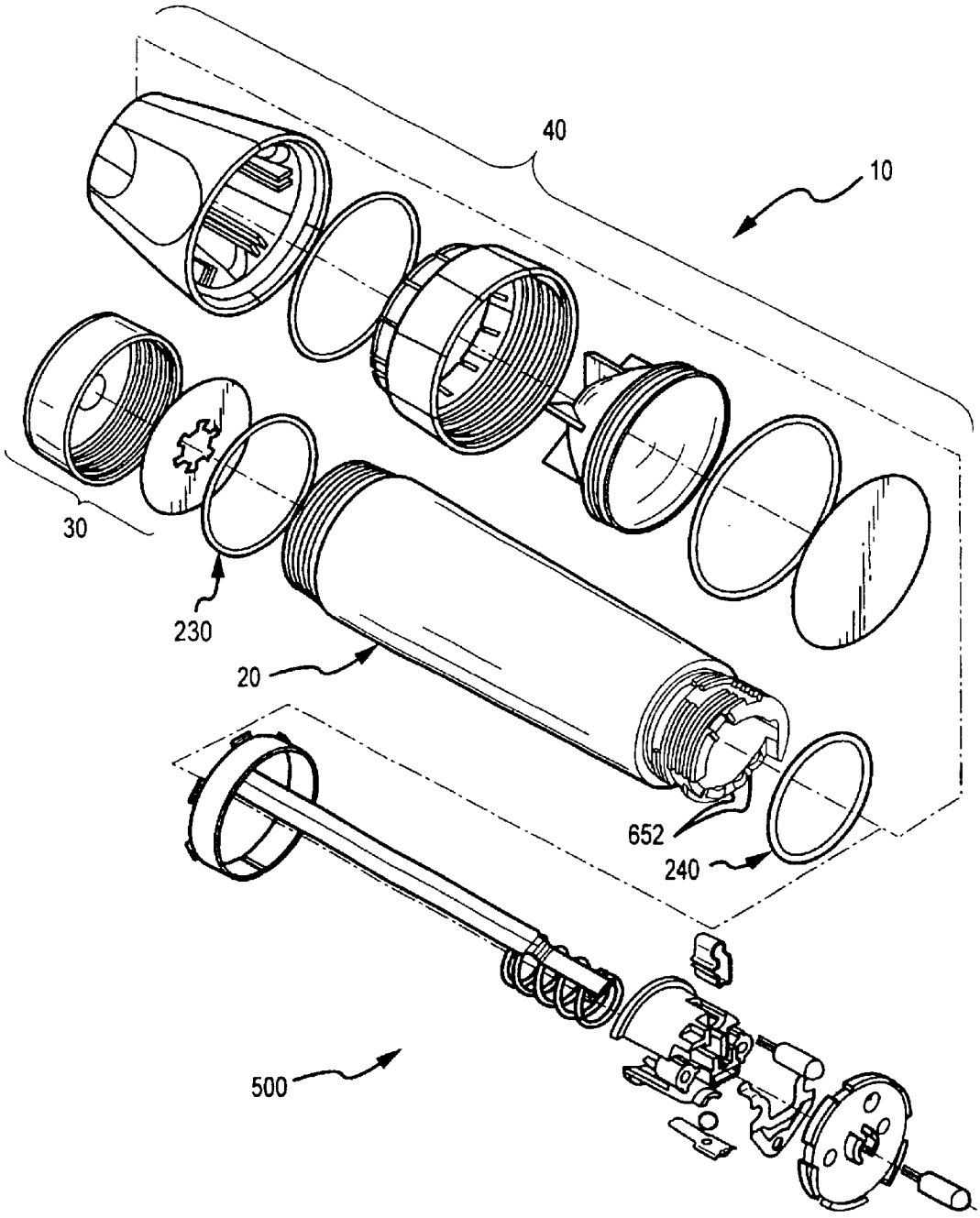
FIG. 16 is an exploded perspective view illustrating the assembly of the flashlight of FIG. 2 having the alternative lamp holder assembly.
Figure 17:
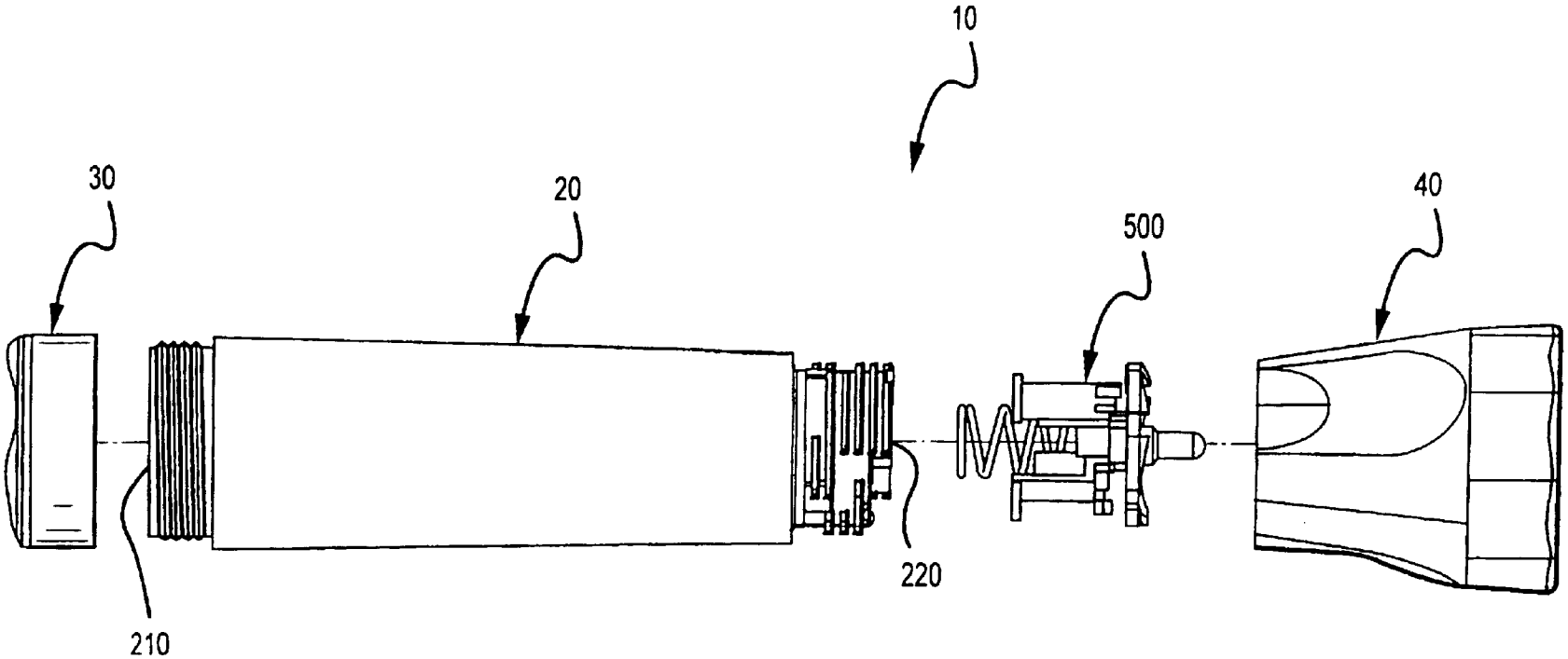
FIG. 17 is an exploded side view of the end cap, chamber, alternative lamp holder assembly and head assembly.
Figure 18:
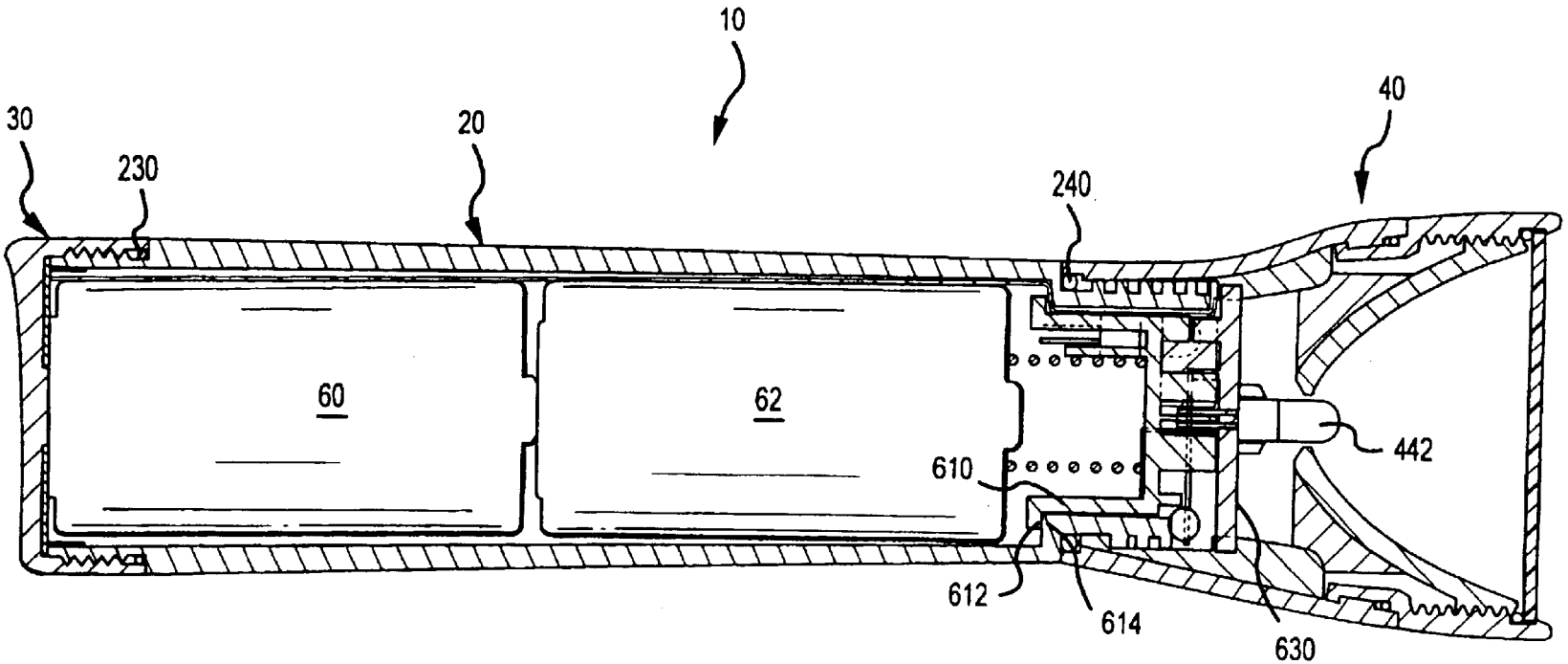
FIG. 18 is a cross-section view of the flashlight, having the alternative lamp holder assembly, down the center of the flashlight of FIG. 2 as taken through the plane indicted by 2-2.
Figure 19:
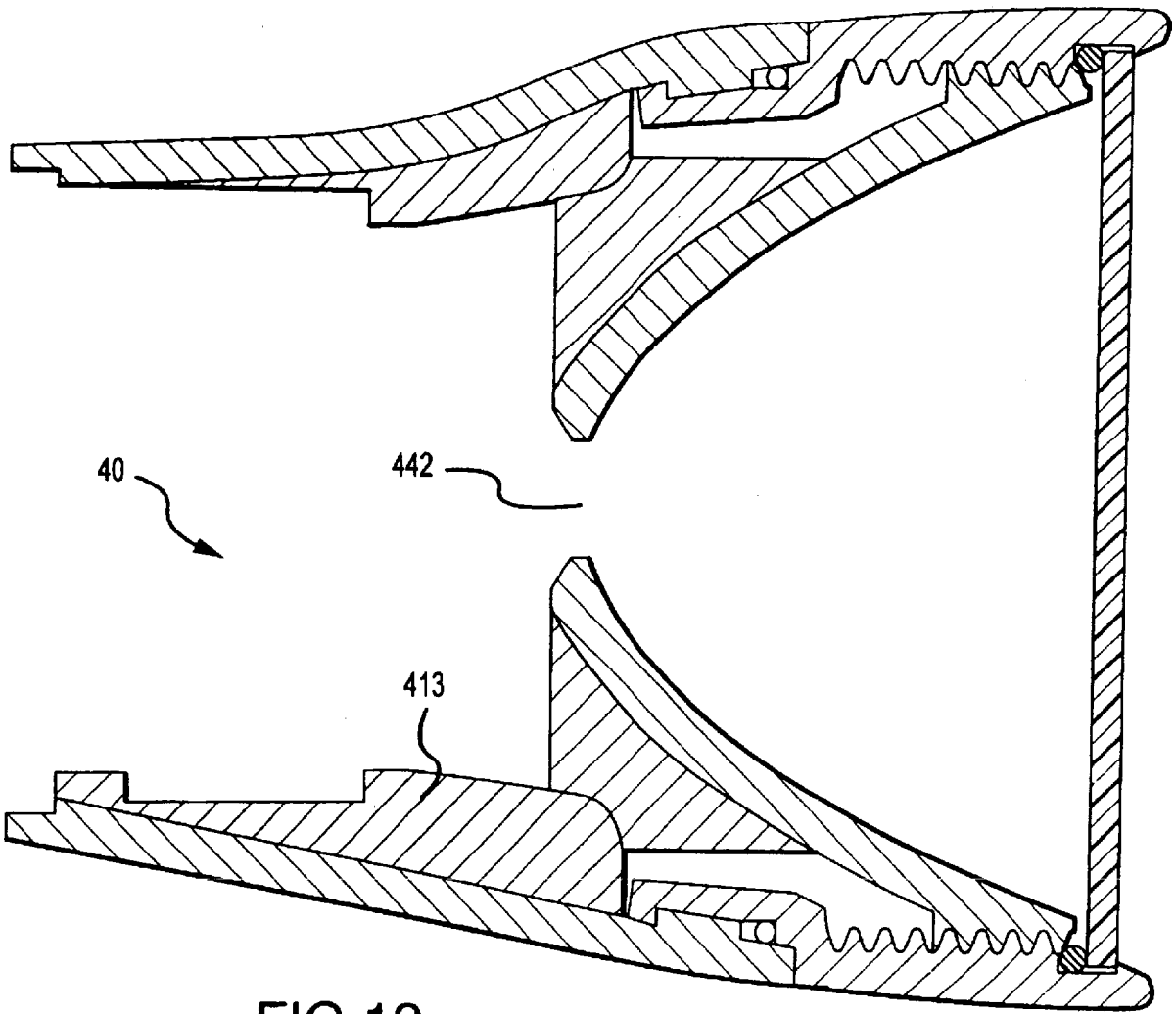
FIG. 19 is a partial cross-section of the head assembly of FIG. 7A as taken through the plane indicted by 7-7, showing a different shaped guide to accommodate the alternative lamp holder assembly.

As shown in FIG. 15B, the spare lamp 71 in the notch 517 is covered by the switch lever's 530 tab 532 when the head portion of the flashlight 10 is assembled. As shown in FIG. 15A, the spare lamp 71 in the notch 517 becomes uncovered by the switch lever's 530 tab 532 when the head assembly 40 is disassembled from the chamber 20. As such, as shown in FIGS. 10, 14A, 14B, 14C, 15A and 15B, the spare lamp 71 is easily accessible by removing the head assembly 40 from the chamber 20, thereby making the spare lamp 71 held by the lamp holder 510 accessible. In this regard, all that is required to replace the lamp 70, is removal of the lamp 70 from the lamp socket 515, removing the spare lamp 71 from the notch 517, and installing the spare lamp 71 into the lamp socket 52. Preferably, the insulated lamp holder 510 includes a phosphorescent coating or additive, which illuminates light in otherwise dark conditions, thereby facilitating lamp replacement in less than desirable light conditions.

Referencing FIGS. 8A, 8B, 9A and 9B, the first pin 72 is electrically connected to the switch sprin 550 by conductive contact 551, and the second pin 74 is electrically connected to the spring 520 by the first conductive contact 588, when the lamp 70 is positioned in lamp holder assembly 50. The conductive spring 520 includes an portion 521 having a nonconductive coating and a tail 522. As shown in FIG. 9A, the tail 522 contacts the positive pole of the battery 62 when the battery 62 is properly aligned in the chamber 20. As shown in FIG. 9B, the portion 521 having a nonconductive coating prevents electrical contact with an improperly aligned battery 62. In this regard, the negative pole of an improperly aligned battery 62 only contacts a nonconductive portion of conductive spring 520 and does not contact a conductive portion, thereby preventing electrical connection and removing the possibility of a catastrophic event due to reverse polarization.

Referring to FIGS. 5, 8A, 8B, 11 and 12, the switch lever 530 is moveable between the "on" and "off" positions when the head portion of the flashlight 10 is assembled. The switch lever 530 includes a switch contact 560 having an edge 561. The switch contact 560 is electrically connected to the switch spring 550. Referencing FIG. 11, the flashlight 10 is shown in the "off" position. In this position, the switch lever 530 is fully extended due to the switch lever 530 being [position] *positioned* between two of the guides 413 within the head piece 410. As a consequence, the switch lever 530 does not electrically connect the edge 561 to the conductive strip 590 at point 594. Moreover, the switch lever [520] *530* in fully extended position provides a detent to maintain the flashlight 10 in the "off" position until flashlight 10 is moved to the "on" position. Referencing FIG. 12, the flashlight 10 is in the "on" position. In this position, the switch lever 530 is compressed due to the switch lever 530 contacting one of the guides 413 within the head piece 410. As a consequence, the switch lever 530 electrically connects the edge 561 to the conductive strip 590 at point 594. In the "on" position, the second lever 540 is positioned between two of the guides 413 within the head piece 410. In this regard, as the head assembly is turned in the direction 288 from the "off" position, the second lever 540 will no longer contact one of the guides 413, and will become fully extended due to the second lever 540 being [position] *positioned* between two of the guides 413 within the head piece 410. The second lever 540 becoming fully extended provides a detent to maintain the flashlight 10 in the "on" position until flashlight 10 is moved to the "off" position. Preferably, the head assembly 40 is rotatable about thirty degrees between the "off" and "on" positions.

Figure 12:
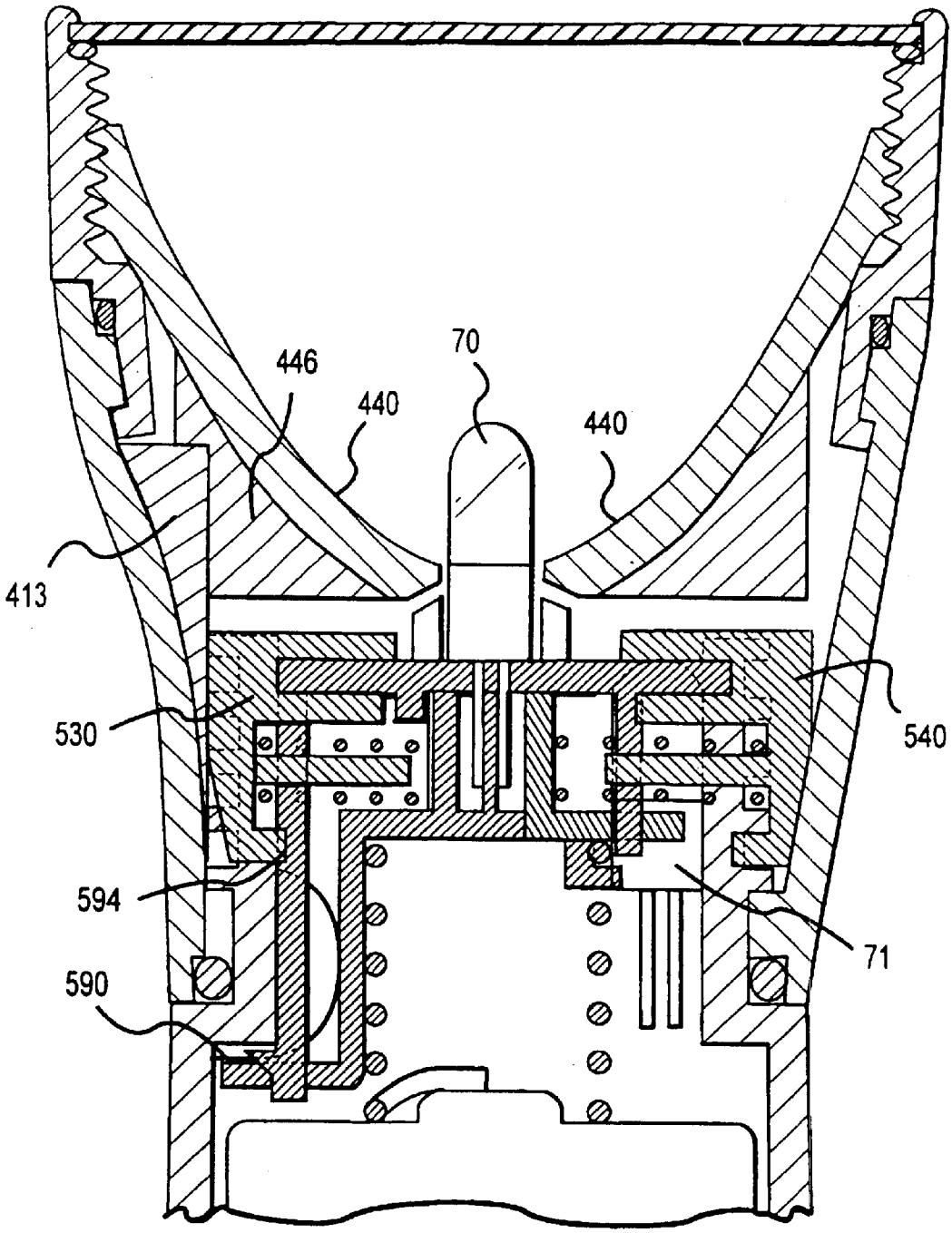
FIG. 12 is partial cross-section of the head portion of the flashlight of FIG. 2, as taken through the plane indicted by 2-2, showing the flashlight in the "on" position.
Figure 14A:
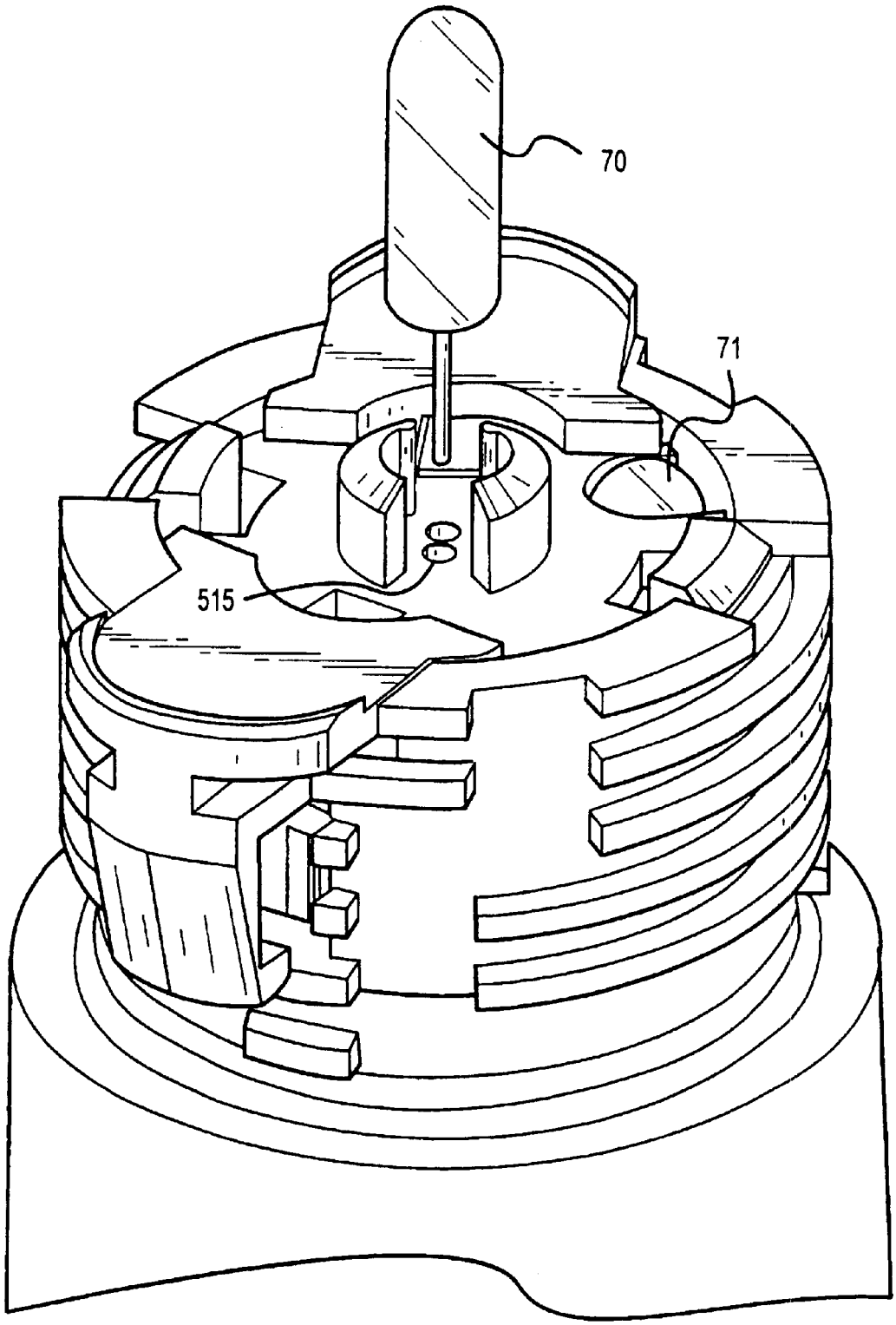
FIG. 14A shows the lamp prior to being inserted into the lamp socket.
Figure 14B:
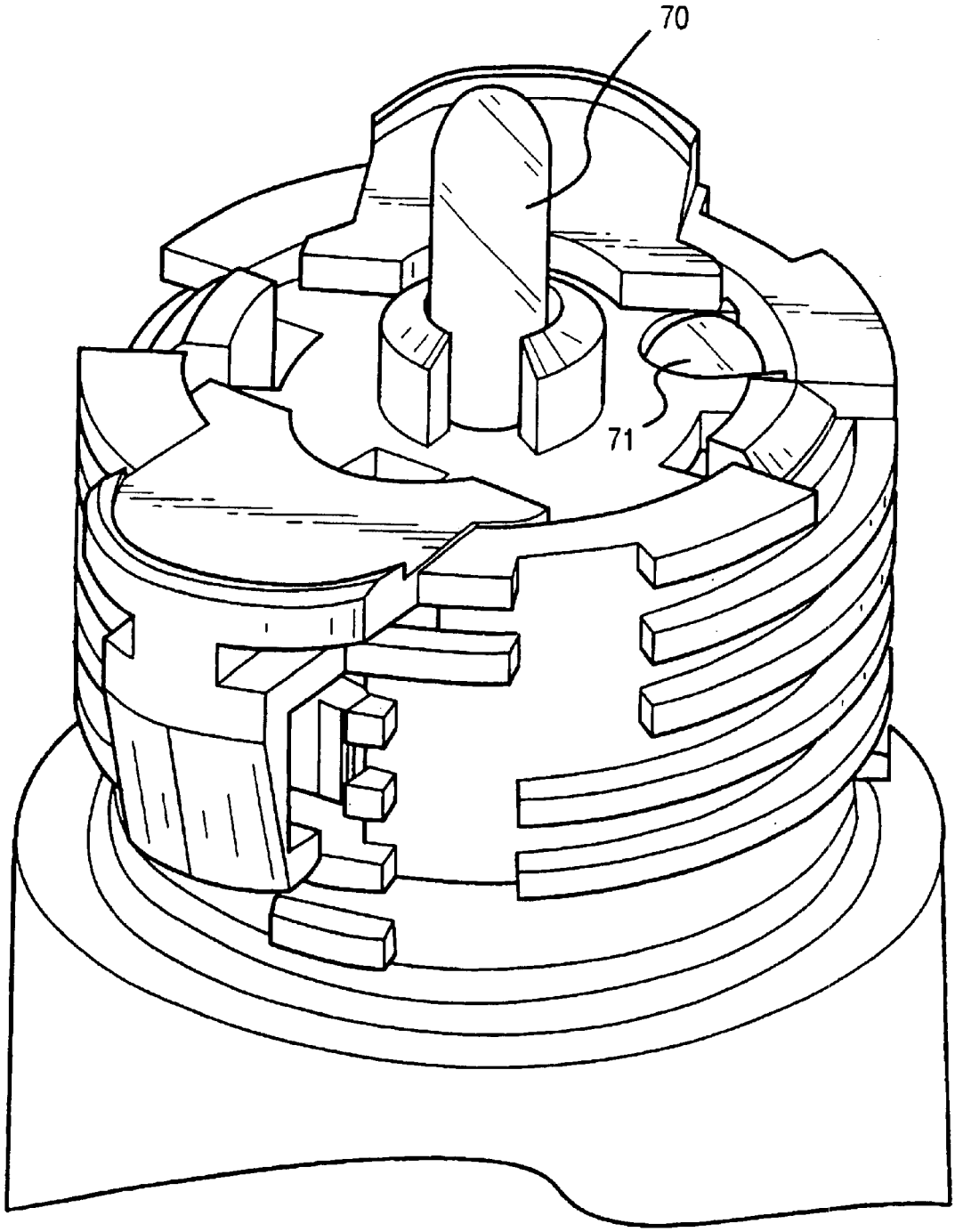
FIG. 14B shows the lamp inserted into the lamp socket.
Figure 14C:
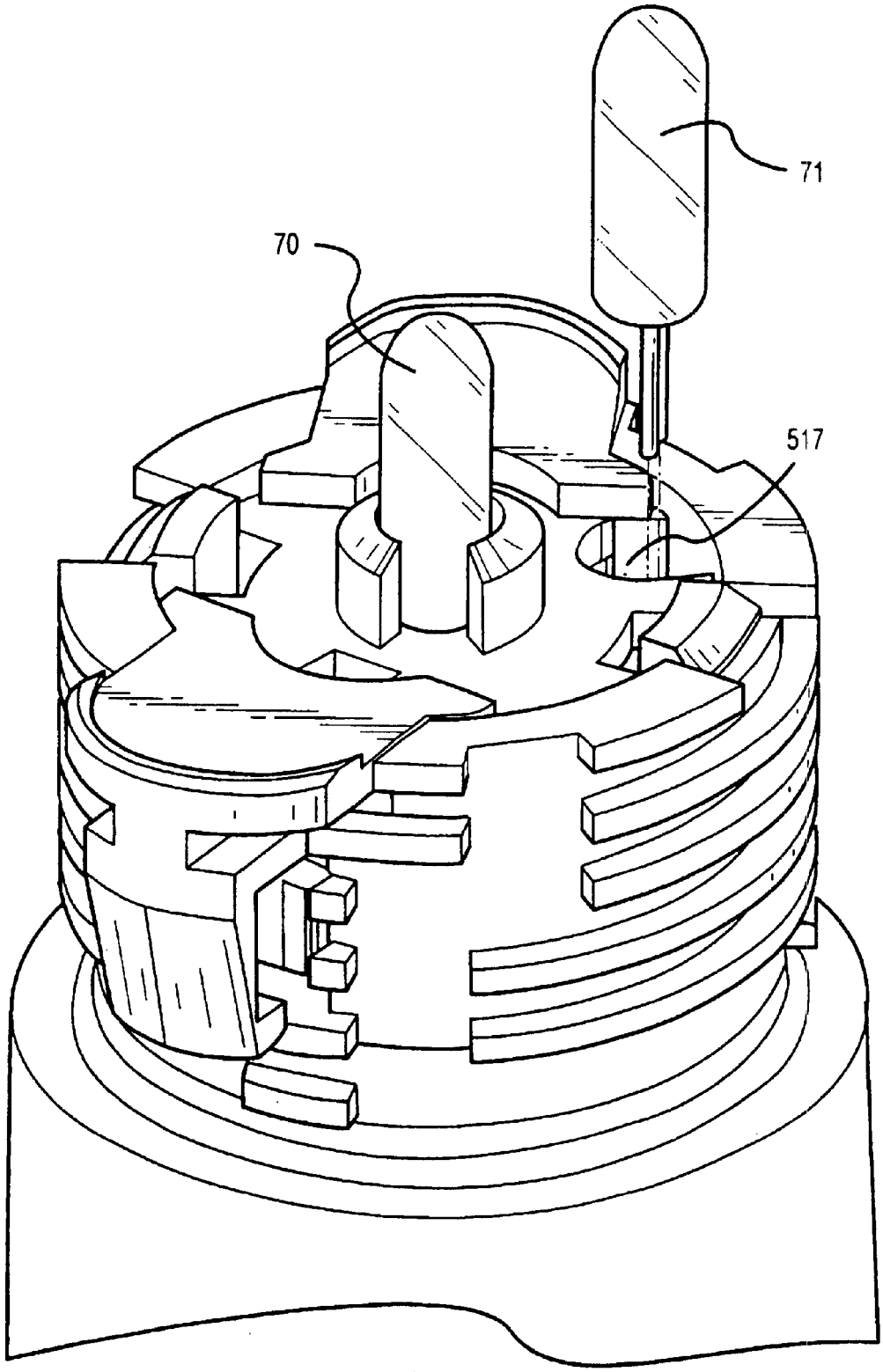
FIG. 14C shows a spare lamp removed from the notch which holds the spare lamp.

The movement of the lamp 70 within the reflector 440 to focus and defocus the light emanating from the lamp 70 is independent from the radial movement of the head assembly 40 to turn the flashlight 10 "on" or "off." When assembled, as shown in FIGS. 11 and 12, the lamp 70 is positioned within the interior of the reflector 440 through the first central opening 442 of the reflector 440. As such, rotating the bezel 430 relative to the head piece 410 causes the reflector 440 to move within the bezel 430 axially relative to the head piece 410. As a result, the reflector 440 moves relative to the lamp 70, and such movement allows for the light emanating from the lamp 70 to be focused by positioning the lamp 70 at the reflector's 440 focal point, or defocused by positioning the lamp 70 away from the reflector's 440 focal point.

Figure 20:
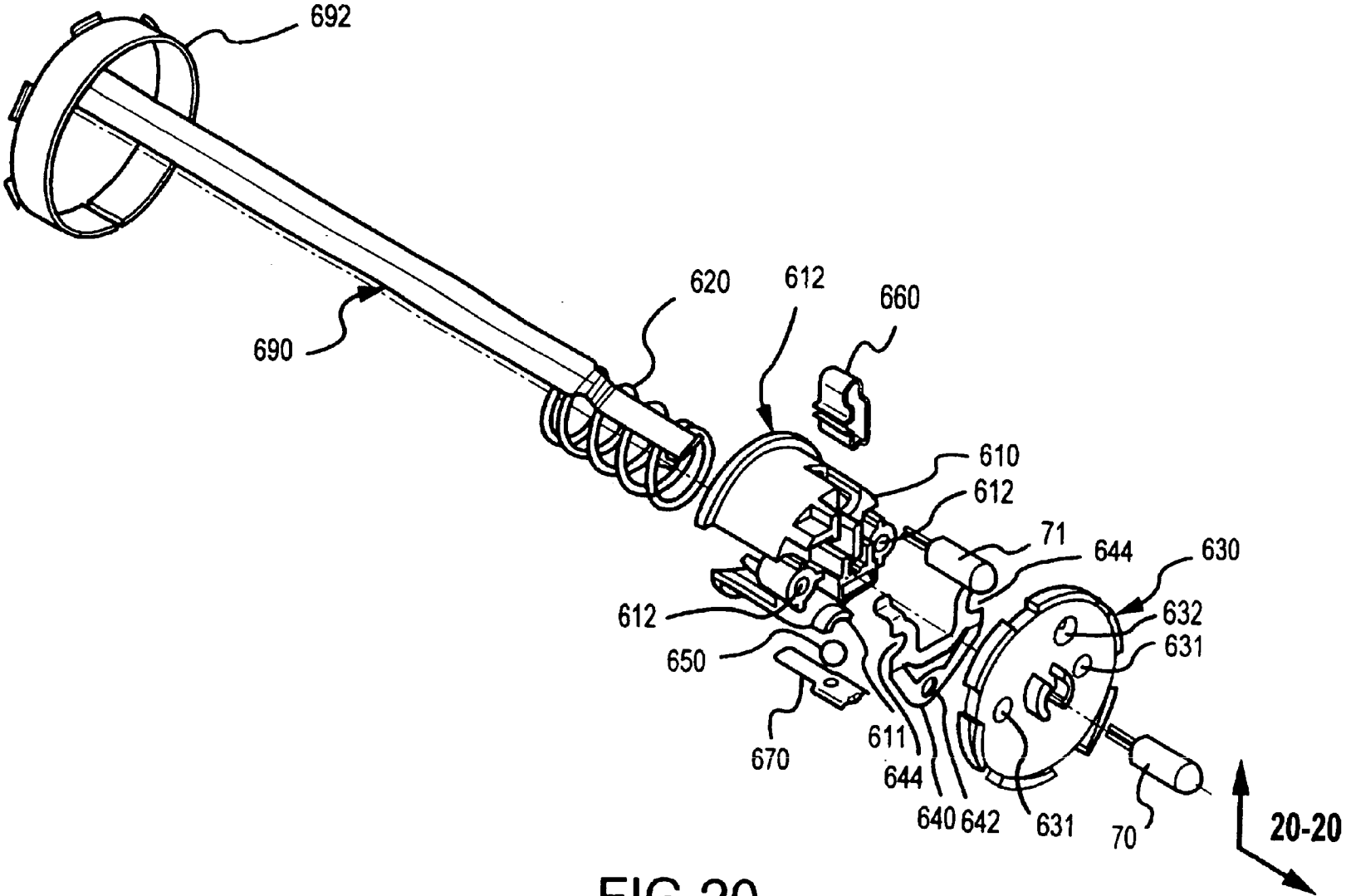
FIG. 20 is an exploded view of the alterative lamp holder assembly.
Figure 21:
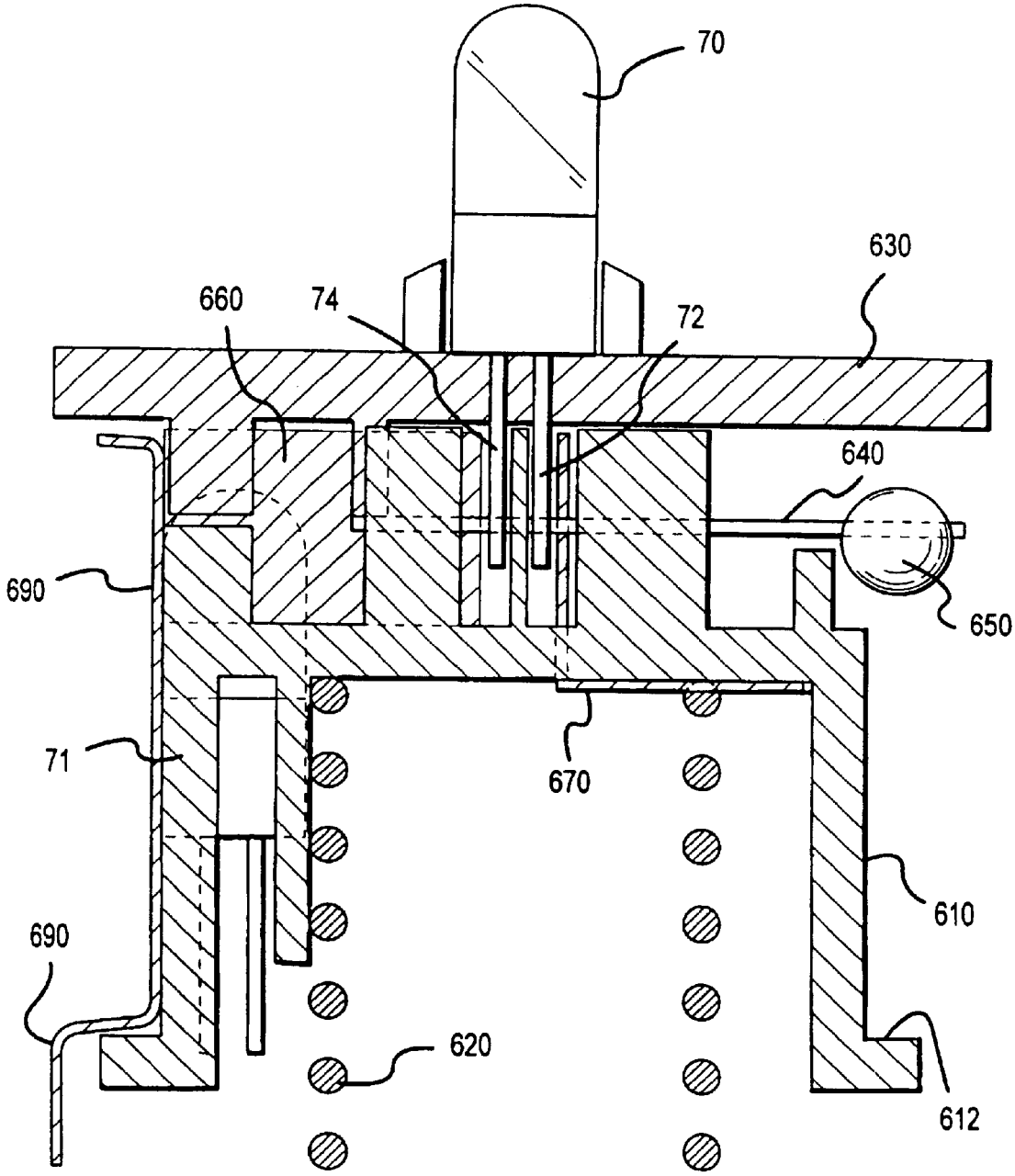
FIG. 21 is a partial cross-section of the lamp holder assembly of FIG. 20 as taken through the plane indicated by 20-20.

As indicated above and with reference to FIGS. 16-27, the lamp holder assembly 50 includes a second embodiment, the lamp holder assembly 500, which moves inside the second end 220 of the chamber 20 when the flashlight 10 is turned "off" or "on." Referencing FIG. 20, the lamp holder assembly 500 includes a lamp holder 610, a conductive spring 620, a switch plate 630, a detent lever 640, a detent ball 650, a switch contact 660, a spring contact 670, a conductive strip 690, and a strip support 692. The lamp holder assembly 500 is assembled to the chamber 20 by first attaching the conductive spring 620 to the lamp holder 610. The lamp holder 610 includes a spring tab (not shown) which engages and retains a portion of the conductive spring 690 and holds the conductive spring 690 in contact with the spring contact 670, as is shown in FIG. 21. The lamp holder 610 and attached conductive spring are next positioned at the second end 220 of the chamber 20. Referencing FIG. 18, the lamp holder 610 includes a tab 612 for contacting a portion of the interior of the chamber 20 near the second end 220 at area 614. Positioning of the lamp holders 610 and attached conductive spring 620 occurs by inserting the lamp holder 610 and attached spring 620 in the first end 210 of the chamber 20 and moving lamp holder 610 toward the second end 220 of the chamber 20 until the tab 612 engages the interior of the chamber 20 at the at area 614. The lamp holder 610 further includes a tab (not shown) which is aligned with a correspond slot (not shown) in the interior of the chamber 20 to ensure that the lamp holder 610 and attached spring 620 are properly positioned at the second end 220 of the chamber 20. The lamp holder 610 is shown positioned at the second end 220 of the chamber 20 in FIGS. 22A and 27.

Referencing FIGS. 22A, 22B, 22C and 27, with the lamp holder 610 exposed at the second end 220 of the chamber 20, the lamp holder assembly 500 is assembled. In this regard, the detent ball 650 is positioned on the lamp holder 610 at the guide 611 and the detent plate 640 is next positioned onto the lamp holder 610 with the detent plate ball opening 642 positioned on the detent ball 650 and the slots 644 aligned with the threaded openings 612 on the lamp holder 610. The switch plate 630 is next positioned with openings 631 aligned with the threaded openings 612. The lamp holder assembly 500 is completely assembled by inserting screws (not shown) through the openings 631, threading the screws to threaded openings 612, and securing the switch plate 630 to the lamp holder 610. As a result, the lamp holder assembly 500 is secured axially and rotatable at the second end 220 of the chamber 20.

Figure 22A:
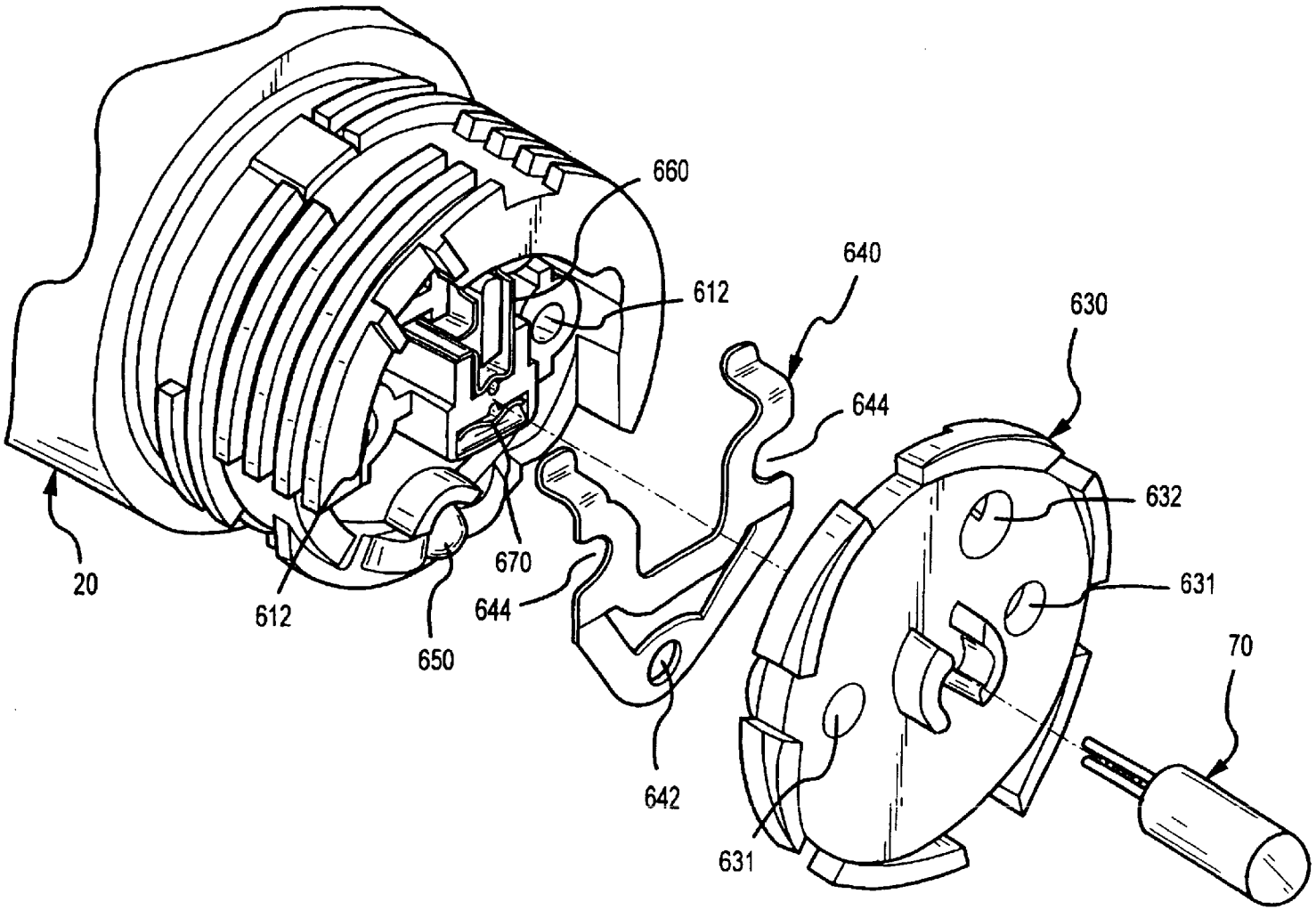
FIG. 22A is a perspective view of the alternative lamp holder assembly positioned within the chamber with the detent lever and switch plate shown apart from the lamp holder assembly.
Figure 22B:
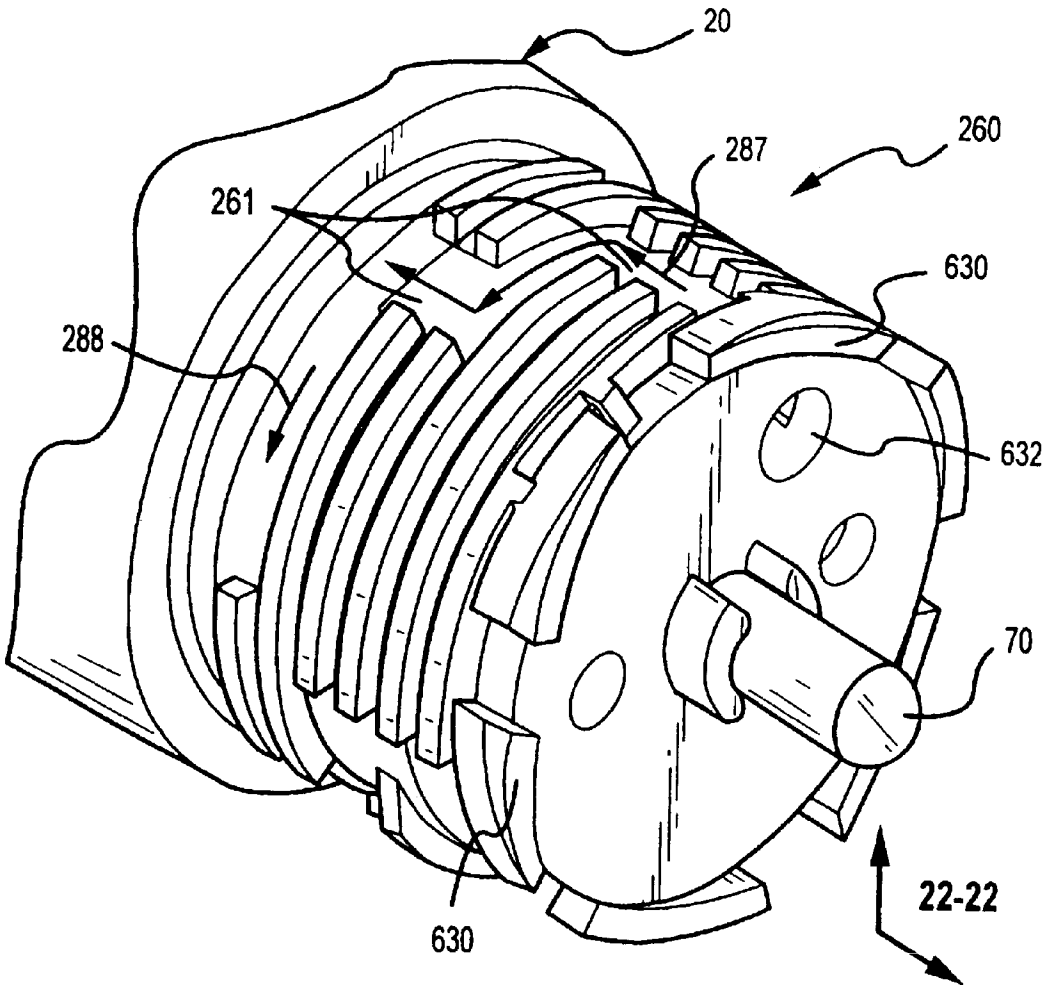
FIG. 22B is a perspective view of the alternative lamp holder assembly fully assembled to the chamber.
Figure 22C:
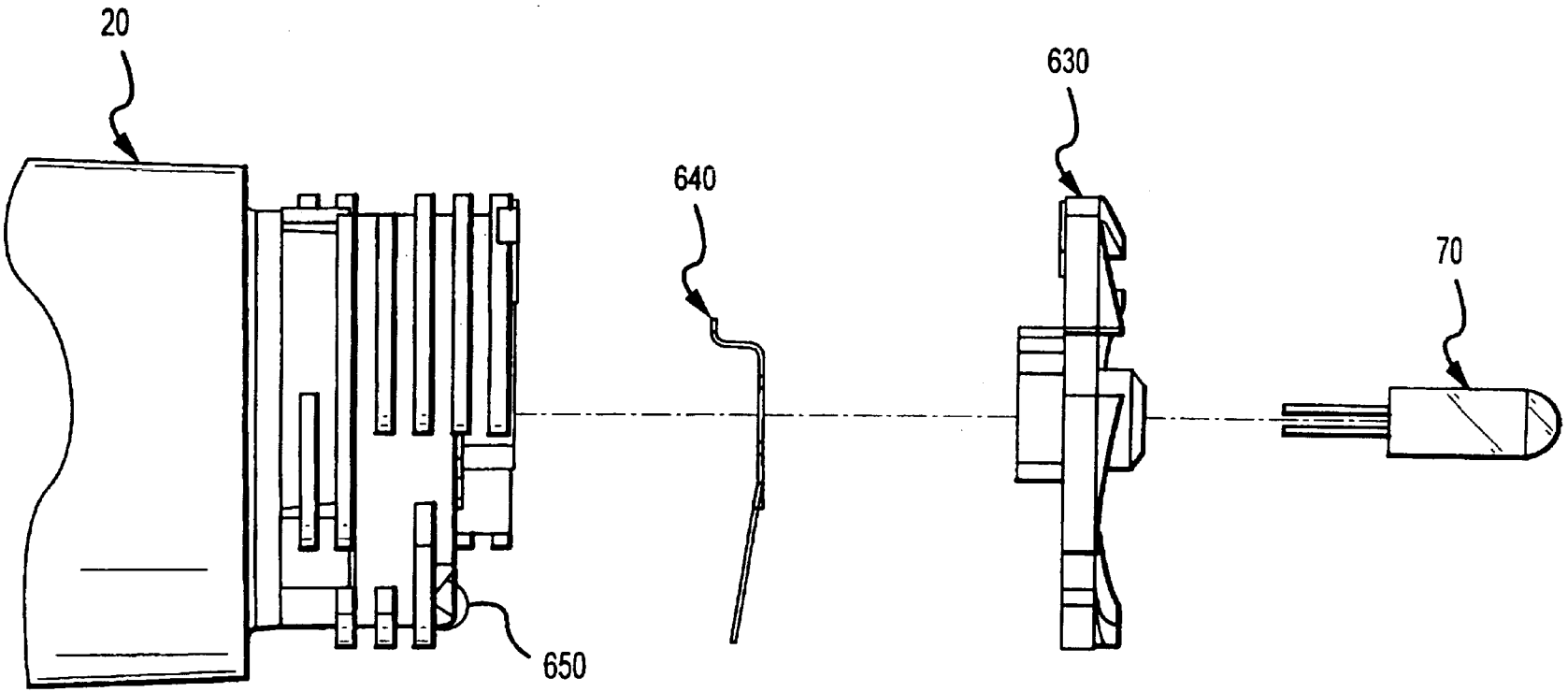
FIG. 22C is a side view of the perspective view shown in FIG. 22A.
Figure 23:
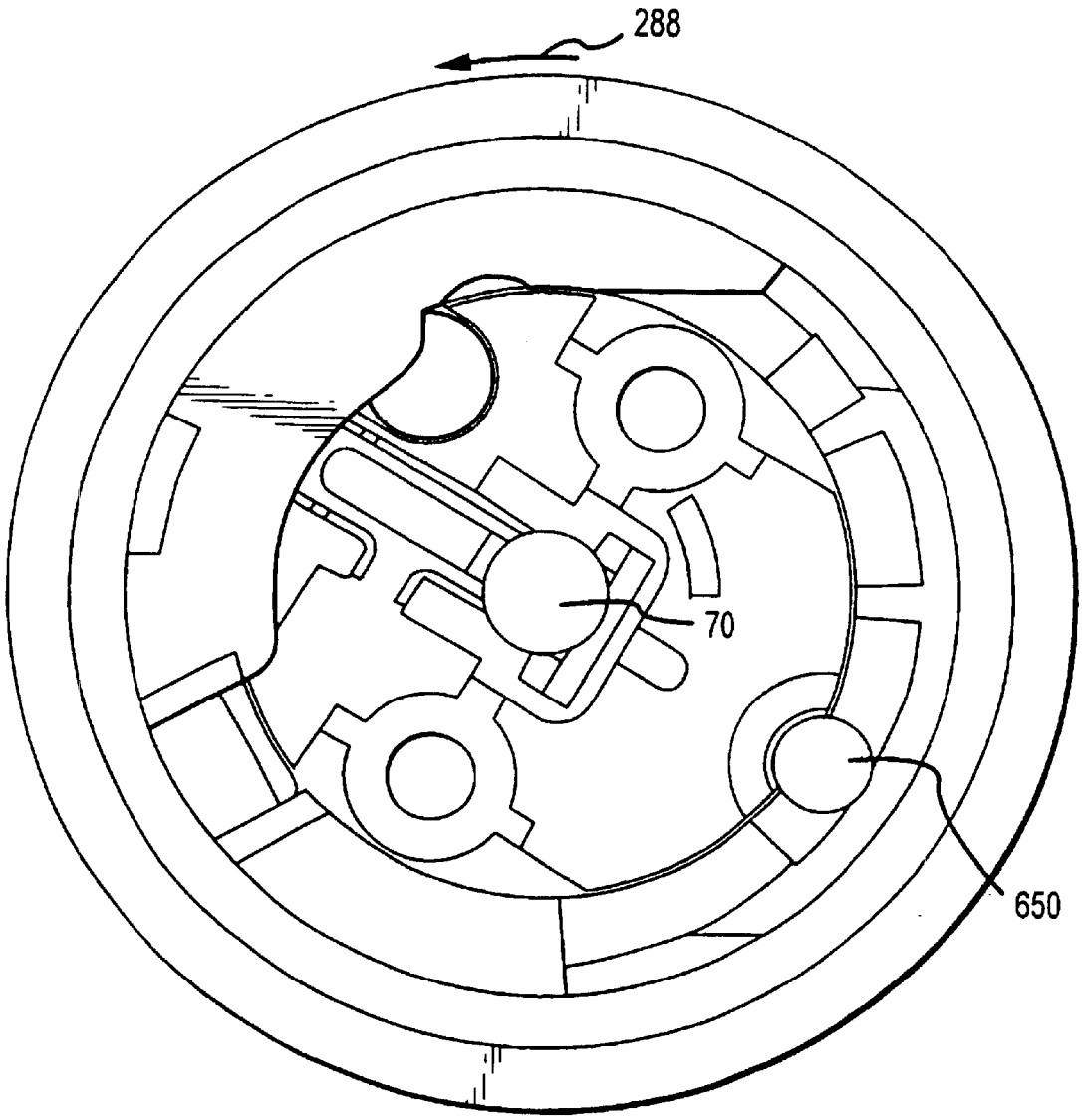
FIG. 23 is a front view of the alternative lamp holder assembly (without the switch plate) at the second end of the chamber, showing the position of the alternative lamp holder assembly when the head assembly is capable of being attached or removed from the second end of the chamber.

As described above and with general reference to FIG. 18, the head portion of the flashlight 10 is assembled by attaching the assembled head assembly 40 to the chamber 20 having the lamp holder assembly 500 assembled in the chamber 20, such that the lamp 70 is positioned within the first central opening 442 of the reflector 440. In this regard, the head assembly 40 is removably attached to the chamber 20 at the second end 220. FIG. 22B shows the lamp holder assembly 500 assembled in the chamber 20 when the head assembly 40 is removed from the chamber 20. The chamber 20 includes the end guide 260 formed on the exterior surface at the second end 220 of the chamber 20. The end guide 260 includes paths 261 which receive and guide the lugs 415 on the head piece 410 when the head assembly 40 is attached to and removed from the chamber 20. The lugs 415 are aligned with paths 261, and the head assembly 40 is guided in the direction 287 until the head assembly 40 is fully seated on the second end 220 of the chamber 20. Detachment of the head assembly 40 occurs by moving the head assembly 40 in the direction opposite 287 until the head assembly 40 is removed. FIG. 23 shows the position of the lamp holder assembly 500 (without switch plate) when the head assembly 40 is capable of being attached to or removed from the chamber 20. Referencing FIGS. 23 and 27, the lamp holder assembly is positioned at a first detent, which is caused by the detent ball 650 being positioned in a first slot 652 on the outer edge of the chamber 20 at the second end 220.

Figure 24:
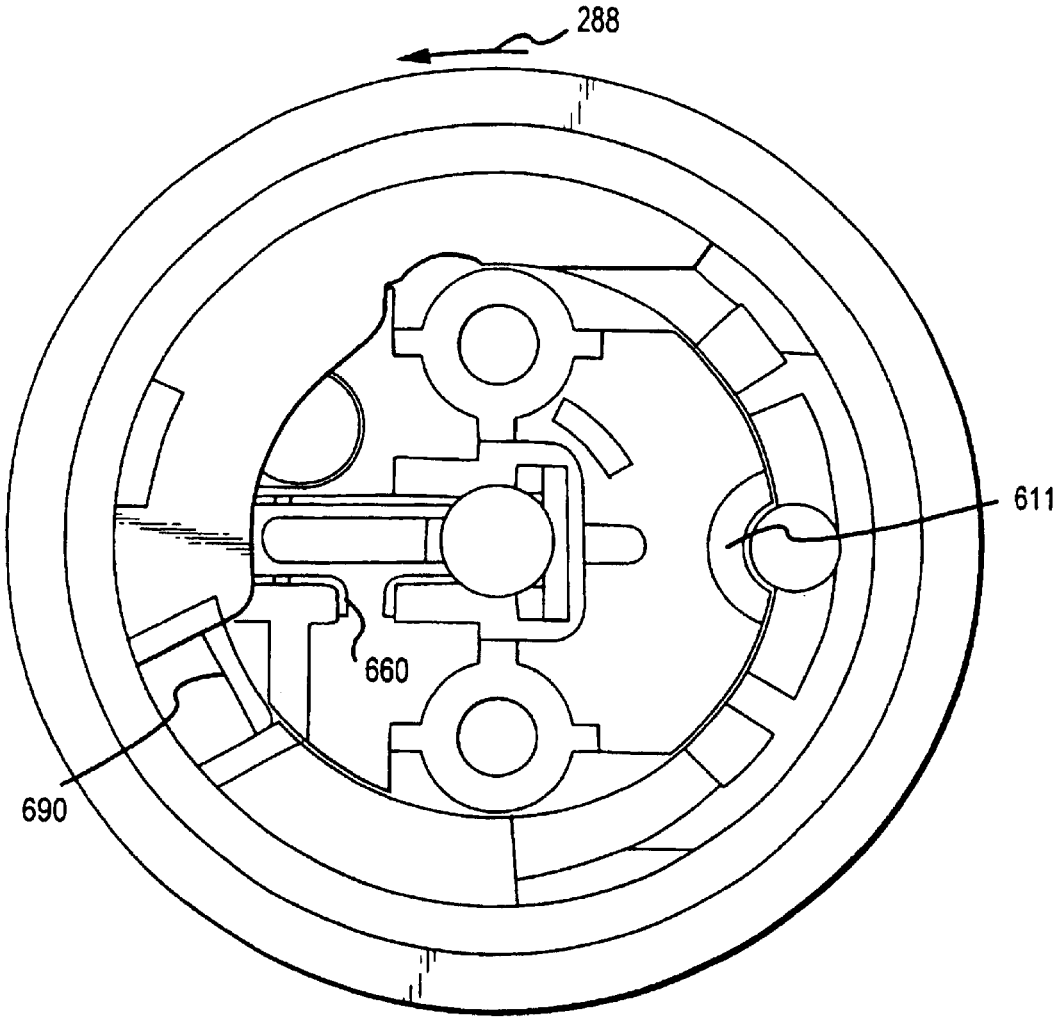
FIG. 24 is a front view of the alternative lamp holder assembly (without the switch plate) at the second end of the chamber, showing the position of the alternative lamp holder assembly when the flashlight is in the "off" position.

When fully seated, the guides 413 of the head assembly 40 engage the slots 634 on the switch plate 630, and the rotation of the head assembly 40 will cause the lamp holder assembly 500 to rotate. The head assembly 40 is then rotated in the direction 288 to a second detent, which is caused by the detent ball 650 being positioned in a second slot 652 on the outer edge of the chamber 20 at the second end 220. The flashlight 10 is in the "off" position at this position. FIG. 24 shows the position of the lamp holder assembly 500 (without switch plate) when the head assembly 40 is in the "off" position. In this position, the head assembly 40 is only permitted to rotate relative to the chamber 20 (i.e., radially) and cannot move away from the chamber 20 (i.e., axially). The head portion of the flashlight 10 can be disassembled by rotating the head assembly 40 from the "off" position in a direction opposite 288 to the first detent, and disengaging the head assembly 40 from the chamber 20 along paths 261.

Figure 25:
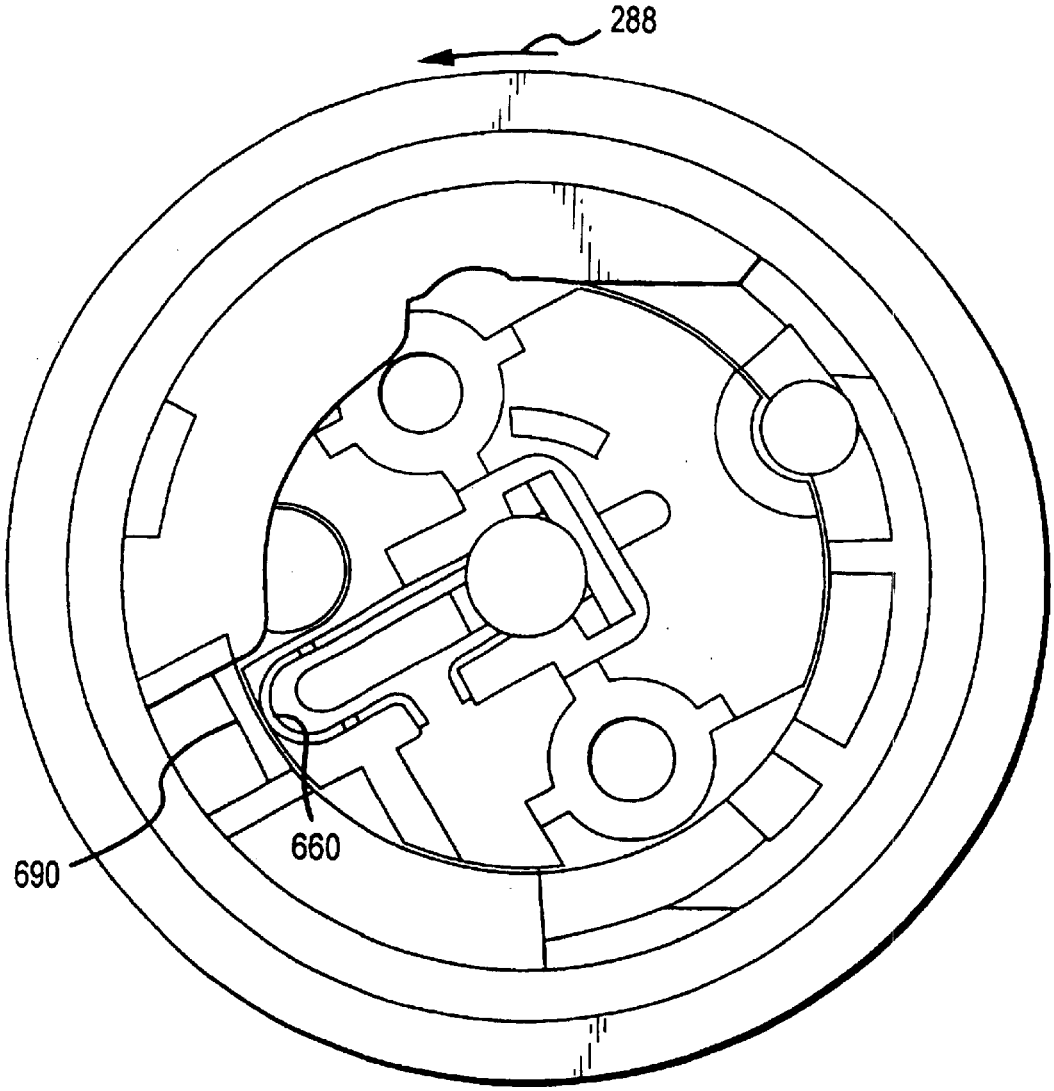
FIG. 25 is a front view of the alternative lamp holder assembly (without the switch plate) at the second end of the chamber, showing the position of the alternative lamp holder assembly when the flashlight is in the "on" position.

When fully assembled and holding batteries 60, 62 in proper alignment, the flashlight 10 is capable of selectively electrically coupling the lamp 70 to the batteries 60, 62. Referencing FIG. 20, the chamber 20 includes a conductive strip 690 along the length of the chamber 20, between the first end 210 and the second end 220. The conductive strip 690 is supported at the first end 210 of the chamber 20 by the strip support 692. The lamp holder assembly 500 selectively electrically connects the lamp 70 to properly positioned batteries 60, 62 in accordance with the radial movement of the head assembly 40. Referencing FIG. 21, the first pin 72 is electrically connected to the switch spring 620 by spring contact 670, and the second pin 74 is electrically connected to the switch contact 660, when the lamp 70 is positioned in lamp holder assembly 500. Referring to FIGS. 16-22, the flashlight 10 is moveable between the "on" and "off" positions by the radial movement of the head assembly in the direction 288. As shown in FIG. 24, the switch contact 660 does not contact the conductive strip 690 in the "off" position. As shown in FIG. 25, the switch contact 660 contacts the conductive strip 690. In this regard, as the head assembly 40 is rotated in the direction 288, the lamp holder assembly 500 is rotated as well. The "on" detent occurs when the detent ball rolls to a third slot 652 on the outer edge of the chamber 20 at the second end 220. Notably, the detent mechanism is physically separated from the switching mechanism. Preferably, the head assembly 40 is rotatable about thirty degrees between the "off" and "on" positions. The movement of the lamp 70 within the reflector 440 to focus and defocus the light emanating from the lamp 70 is independent from the radial movement of the head assembly 40 to turn the flashlight 10 "on" or "off" as described previously.

Figure 26:
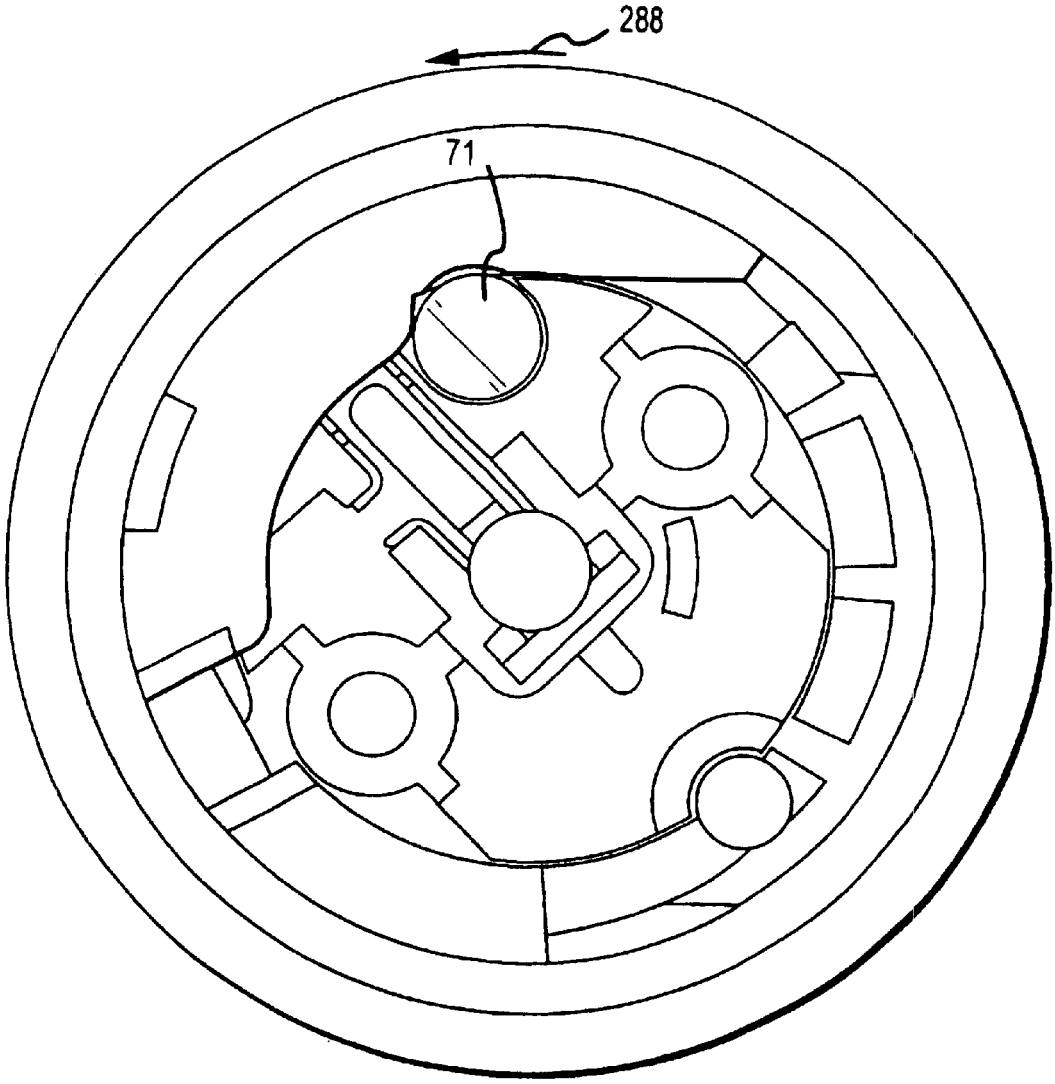
FIG. 26 is a front view of the alternative lamp holder assembly (without the switch plate) at the second end of the chamber, showing the position of the alternative lamp holder assembly which exposes the spare lamp.
Figure 27:
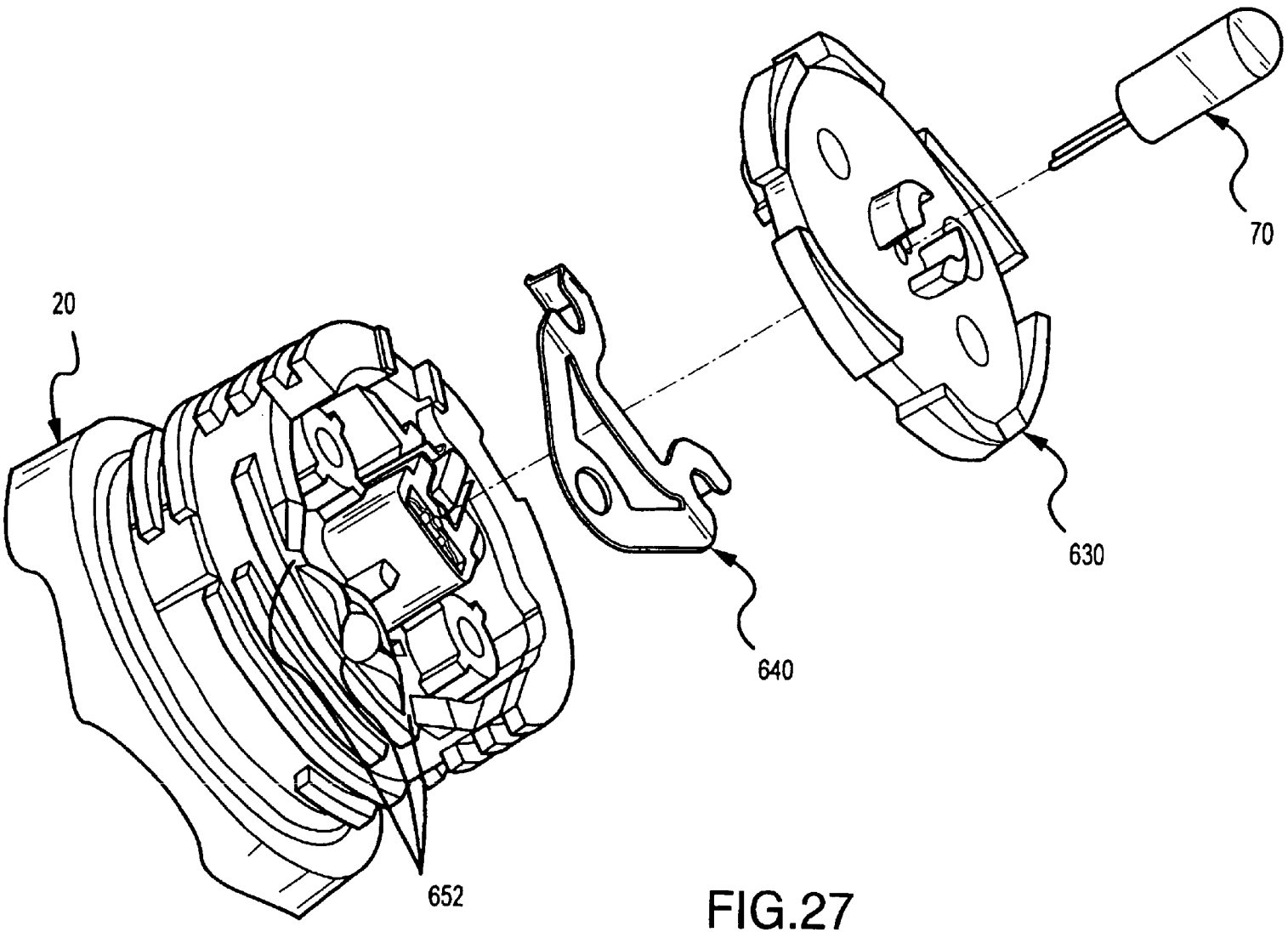
FIG. 27 is a perspective view of the alternative lamp holder assembly positioned within the chamber with the detent lever and switch plate shown apart from the lamp holder assembly.

The spare lamp 71 is held secure by the switch plate 630, until the user of the flashlight 10 rotates the lamp holder assembly 500 to align the spare lamp opening 632 with the spare lamp 71. Referencing FIG. 23, the lamp holder assembly 500 (without switch plate) is shown in the position when the head assembly 40 is removed from the chamber 20. From this position, the spare lamp opening 632 is aligned with the spare lamp 71 by rotating the lamp holder assembly in the direction opposite direction 288. FIG. 26 shows the position of the lamp holder assembly 500 (without switch plate) when the spare lamp opening 632 is aligned with the spare lamp 71. Once aligned, the spare lamp 71 is removable from the lamp holder assembly 500.

Notably, the reflector 440 and lens 460 combination accomplishes one of the objectives of the present invention, namely to provide improved light gathering from the lamp 70, optimum focus spot and minimal light void within the light projected by the reflector 440 throughout the range of the lamp's 70 movement within interior of the reflector 440. In this regard, one embodiment of the present invention uses conic reflectors 440 other than a parabolic reflector.

Figure 1A:
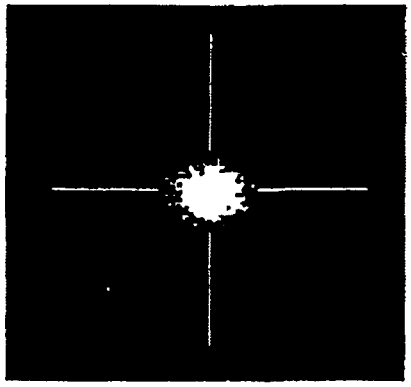
FIG. 1A shows a light beam dispersion from a parabolic reflector with a light source positioned at the focal point of the reflector.
Figure 1B:
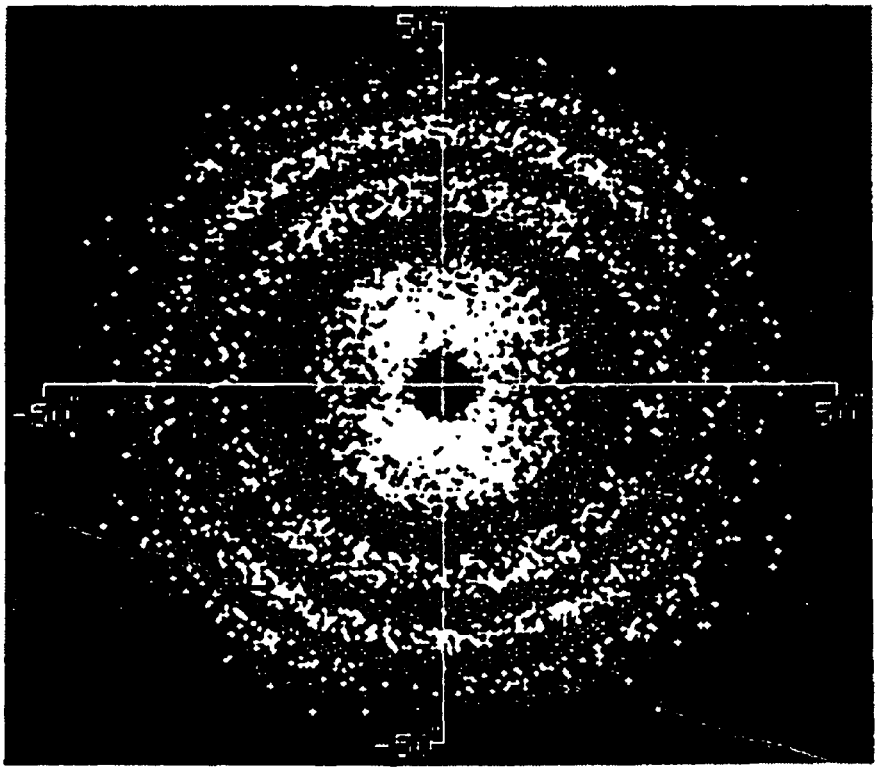
FIG. 1B shows a light beam dispersion from a parabolic reflector with a light source defocused ⅓ the distance from the focal point to apex of the reflector curvature.
Figure 2:
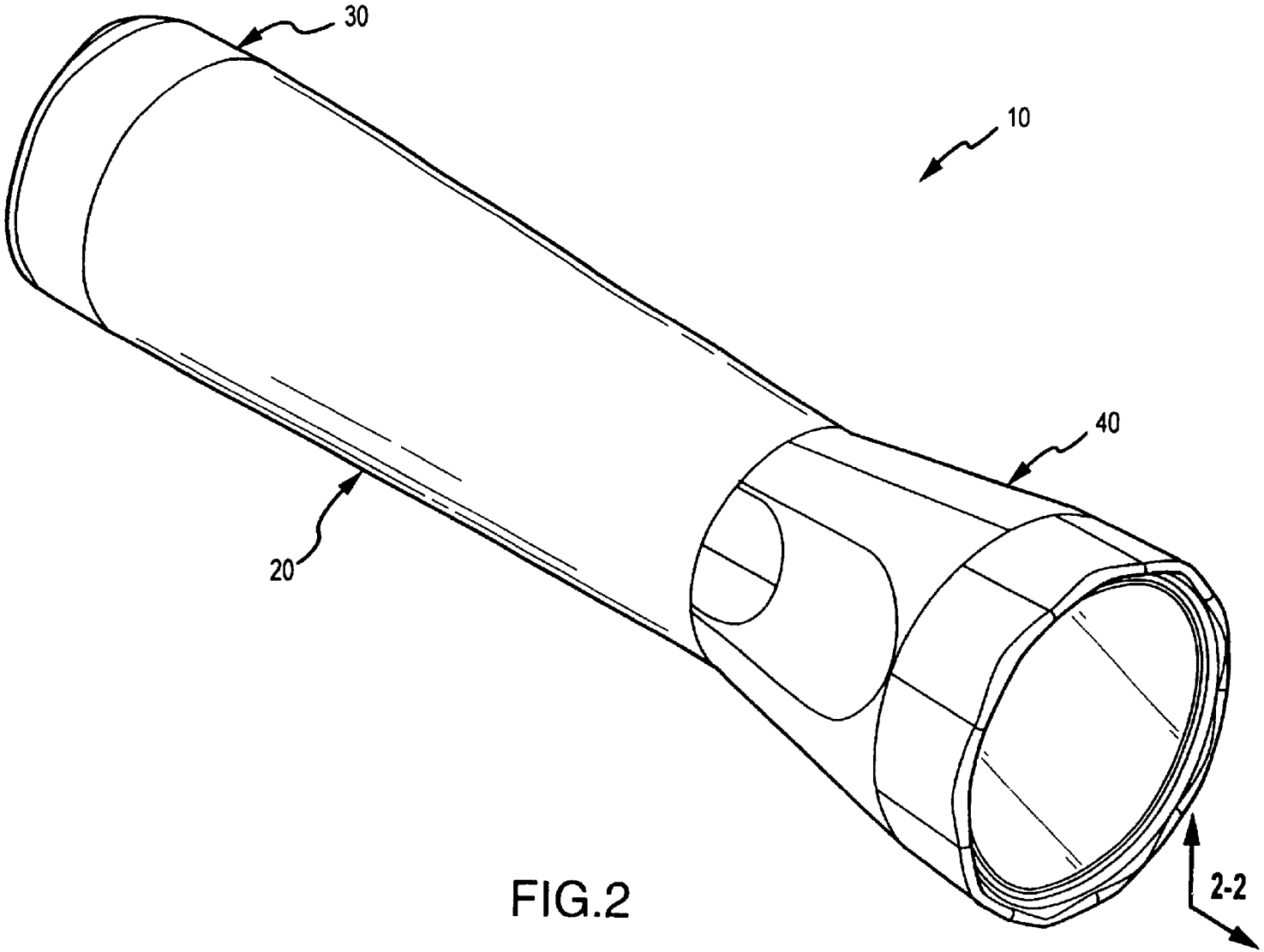
FIG. 2 is a perspective view of a flashlight in accordance with the present invention.
Figure 3:
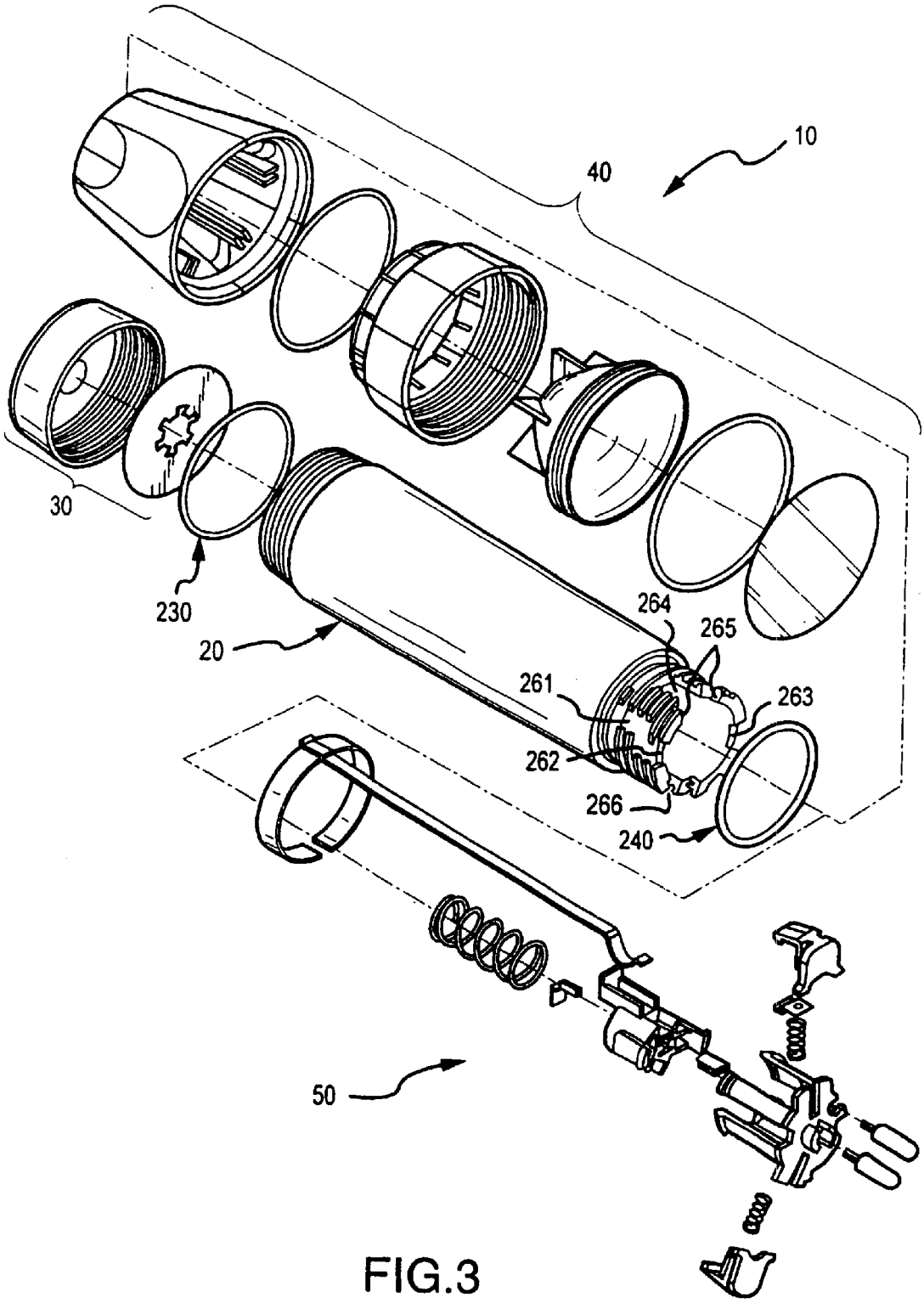
FIG. 3 is an exploded perspective view illustrating the assembly of the flashlight of FIG. 2.
Figure 4:
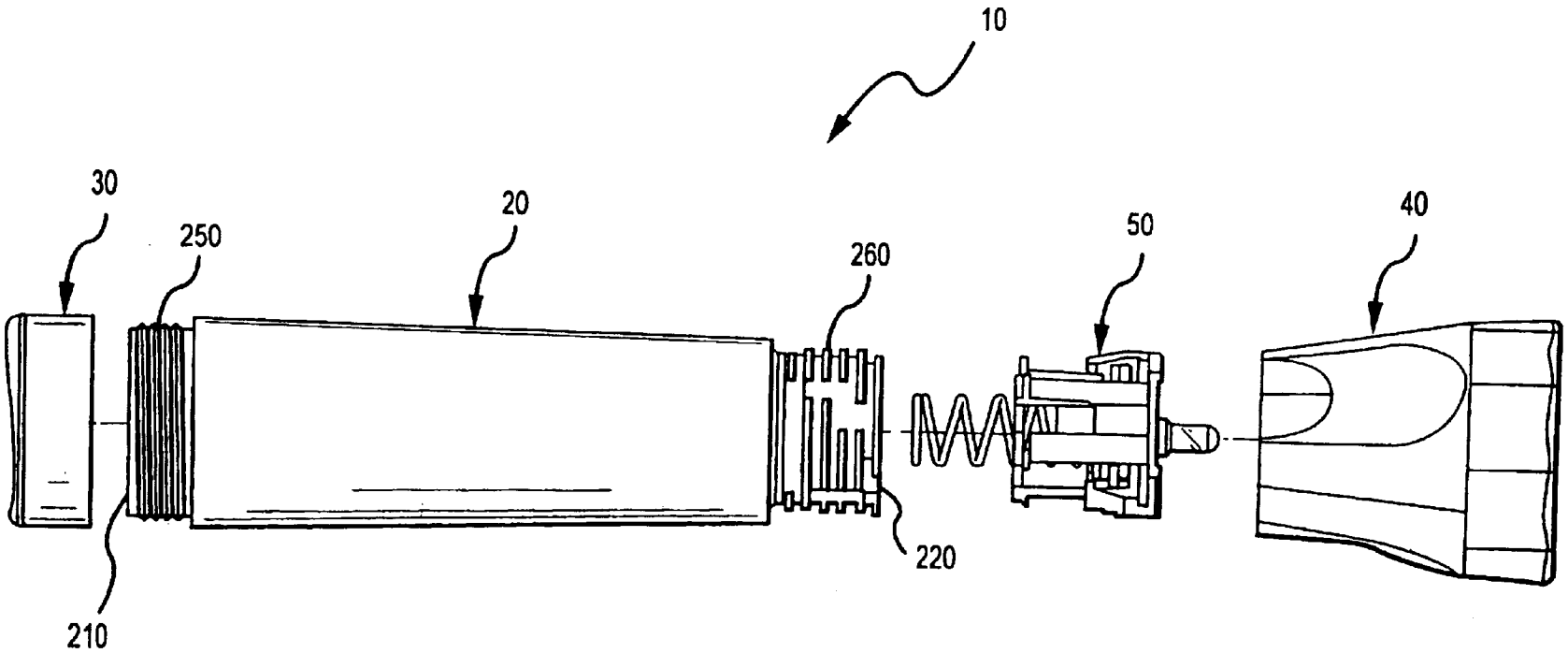
FIG. 4 is an exploded side view of the end cap, chamber, lamp holder assembly and head assembly.

The vertex curvature (i.e., the actual shape) of the reflector 440 is determined using the following equation for a Vertex Cartesian coordinate system:

$$f(r)=Cr^2/(1+\sqrt{(1-SC^2r^2)}), \quad (1.1)$$

wherein C is the vertex curvature, r is the radial distance from the cylindrical center of the optic, and S is equal to unity minus the square of the eccentricity. In this regard, it was discovered that the use of nonparabolic reflectors minimized the light void which is apparent when a parabolic reflector was used, as shown in FIG. 1B. Additionally, it was also discovered that matching nonparbolic reflectors with an appropriate lens curvature optimized the direction of the rays emanating from the nonparabolic reflector. For elliptical reflectors (i.e., 0<eccentricity<1), it was determined that the use of a negative or a flat lens caused a more uniform and intense ray pattern when the light source was placed at the optimum optical focal point. For hyperbolic reflectors (i.e., eccentricity>1), it was determined that the use of a positive or flat lens caused a more uniform and intense ray pattern when the light source was placed at the optimum optical focal point.

Referring to the table shown in FIGS. 13A and 13B, a series of simulations were run using the equation 1.1, wherein the eccentricity ranged from 0.8 to 1.25. The criteria for the results shown in FIGS. 13A and 13B were as follows: (i) a reflector aperture (i.e., the size of the reflector's 44 second central opening 49) of 1.4375"; (ii) a reflector opening (i.e., the size of the reflector's 44 first central opening 48) of 0.19"; (iii) a maximum lighted spot size of 29" to be illuminated by the flashlight 10 at a distance of 120"; (iv) a minimum light void through out the range of focus (i.e. the movement of the lamp 70 along the reflector's 440 optical axis from about the reflector's 440 focal point to the point the lamp 70 exits the reflector 440 at either the first central opening 442 for a elliptical reflector or the second central opening 444 for a hyperbolic reflector); (v) a maximum range of motion of the lamp 70 throughout the range of focus of no grater than about 0.25"; (vi) a minimum angle of subtended light gathered by the reflector of about 100 degrees; and (vii) a lens with effective focal length of no less than about +2.5" or no greater than −2.5.

For each given eccentricity and lens combination, the vertex curvature was adjusted to attain the minimum focused spot size and void throughout the range of focus and the maximum subtended angle of light gathered by the reflector 440. This was performed for each value of eccentricity by taking a sample of lenses with effective focal lengths of no less absolute value than about 2.5", running simulations wherein the vertex curvature was increased until no void appeared when the lamp 70 was completely defocused (i.e. the lamp 70 exits the reflector 440 at either the first central opening 442 for a elliptical reflector, or the second central opening 444 for a hyperbolic reflector). The value of vertex curvature was not increased beyond what which was reasonably necessary to remove the void, because increasing the vertex curvature further reduced the potential magnification of the lamp's 70 light beam as the lamp 70 was moved away from the focal point of the reflector 440.

In view of the simulations and the criteria specified, the elliptical reflector, preferably has an eccentricity value of no less than about 0.80 and no more than about 0.99. Preferably, the elliptical reflector has a vertex curvature value of no less than about 2.0 and no more than about 5.2. In one arrangement, the elliptical reflector has an eccentrically value of about 0.96 and a vertex curvature of about 3.1. In one embodiment of the present invention, a flashlight 10 having an elliptical reflector is matched with a negative or flat lens. Preferably, an elliptical reflector is matched with a lens having an effective focal length of no greater than about −2.5" and no more than about 0". In one arrangement, an elliptical reflector 44 having an eccentricity value of about 0.96 and a vertex curvature of about 3.1 is matched with a lens 45 having an effective focal length of about 0".

In accordance with another embodiment of the present invention, the head assembly 40 includes a hyperbolic reflector. Preferably, the hyperbolic reflector has an eccentricity value of no less than about 1.01 and no more than about 1.25. Preferably, the hyperbolic reflector has a vertex curvature value of no less than about 2.0 and no more than about 7.2. In one arrangement, the hyperbolic reflector has an eccentricity value of about 1.04 and a vertex curvature of about 3.3. In another embodiment, a flashlight 10 having a hyperbolic reflector is matched with a positive or flat lens. Preferably, a hyperbolic reflector is matched with a lens having an effective focal length no less than about 2.5". In one arrangement, a hyperbolic reflector 440 having an eccentricity value of about 1.04 and a vertex curvature of about 3.3 is matched with a lens 460 having an effective focal length of about 0".

The foregoing description of the present invention has been presented for purposes of illustration and description. The description is not intended to limit the invention to the form disclosed herein. Consequently, the invention and modifications commensurate with the above teachings and skill and knowledge of the relevant art are within the scope of the present invention. It is intended that the appended claims be construed to include all alternative embodiments as permitted by the prior art.

What is claimed is:

1. A flashlight comprising:

(a) chamber means for retaining at least one battery;

(b) a lamp;

(c) electrical coupling means for holding said lamp and selectively electrically coupling said lamp and said at least one battery retained by said chamber means;

(d) a head piece attached to said chamber means and solely rotatable radially relative to said chamber means;

(e) a reflector for reflecting light from said lamp;

(f) a bezel attached to said head piece and solely rotatable radially relative to said head piece;

wherein said bezel is rotatable to cause said reflector to axially move relative to said chamber *means*;

wherein said head piece is rotatable to cause said electrical coupling means to selectively electrically couple said lamp and said at least one battery retained by said chamber means.

2. A flashlight as claimed in claim 1, wherein said bezel is rotatable in a first direction relative to said head piece to cause said reflector to move away from said chamber means and rotatable in a second direction relative to said chamber means to cause said reflector to move towards said chamber means.

3. A flashlight as claimed in claim 1, wherein said coupling means comprises:

a lamp holder assembly for holding said lamp;

wherein the rotation of said head piece relative to said chamber means causes said lamp holder assembly to rotate to cause said electrical coupling means to electrically couple said lamp and said at least one battery retained by said chamber means.

4. A flashlight as claimed in claim 1, said flashlight further comprises:

detent means for providing a first detent position whereto said head piece is capable of being rotated to and removably fixed;

wherein said head piece is rotatable to said first detent position to cause said electrical coupling means to selectively electrically couple said lamp and said at least one battery retained by said chamber means;

wherein said detent means is structurally independent of said electrical coupling means.

5. A flashlight as claimed in claim 1, said flashlight further comprises:

detent means for providing a first detent position whereto said head piece is capable of being rotated to and removably fixed;

wherein said head piece is rotatable to said first detent position to cause said electrical coupling means to selectively electrically couple said lamp and said at least one battery retained by said chamber means;

wherein said detent means is structurally part of said electrical coupling means.

6. A flashlight which is portable and hand held, and which is capable of operating with at least one battery, said flashlight comprising:

(a) a chamber for retaining at least one battery, wherein said chamber comprises a first opening for receiving one or more batteries; and a second opening substantially opposite said first opening;

(b) an end cap removably connected to said chamber for selectively covering and uncovering said first opening;

(c) a light [bulb]*source*;

(d) means for holding said light [bulb]*source*, said means *for holding said light source* retained by said chamber at said second opening;

(e) coupling means for selectively electrically coupling said means for holding a light [bulb] *source* and said at least one battery retained in said chamber;

(f) a conic reflector comprising a first central opening, a second central opening substantially opposite said first central opening, and an inner area defined by the space between said first central opening and said second central opening;

(g) a lens;

(h) head assembly means for positioning said lens and said reflector relative to said light [bulb] *source* when said head assembly means is connected to said second opening of said chamber;

wherein said head assembly means further comprises (i) a head piece which is solely rotatable radially relative to said chamber to cause said coupling means to selectively electrically couple said means for holding [a] *said* light [bulb] *source* and said at least one battery retained in said chamber, and (ii) a bezel which is solely rotatable relative to said head piece to cause said reflector to axially move relative to said light [bulb]*source*.

7. A flashlight as claimed in claim 6, wherein said head assembly means holds said lens a fixed distance from said light [bulb] *source* when said bezel is rotated.

8. A flashlight as claimed in claim 6, wherein said head assembly *means* comprises a first portion and a second portion;

wherein said first proton is rotatable relative to said chamber to cause said coupling means to selectively electrically couple said means for holding [a lamp bulb] *said light source* and said at least one battery retained in said chamber;

wherein said [head assembly means] *second portion* is rotatable relative to said first portion to cause said conic reflector to move relative said [lamp]*light source*.

9. A flashlight as claimed in claim 8, wherein said first portion is a head piece and said second portion is a bezel.

10. A flashlight as claimed in claim 6, wherein said head assembly means fixedly positions said lens relative to said light [bulb] *source* and moveably positions said reflector relative to said light [bulb]*source*.

11. A flashlight comprising:

(a) chamber means for retaining at least one battery;

(b) a lamp;

(c) coupling means for selectively electrically coupling said lamp and said chamber means; and (d) a head assembly comprising:

a reflector having a first central opening, a second central opening substantially opposite said first opening, and an inner area between said first central opening and said second central opening;

a lens;

a head piece rotatable relative to the chamber means to cause said coupling means to selectively electrically couple said lamp and said chamber means;

a bezel rotatable relative to said head piece such that the position of said lamp may be varied within said inner area of said reflector to focus and defocus light illuminated by said lamp.

12. A flashlight comprising:

(a) chamber means for retaining at least one battery;

(b) lamp holder means for holding a lamp;

(c) electrical coupling means for selectively electrically coupling said chamber *means* and said lamp holder *means*;

(d) a reflector;

(e) a head piece that is rotatably secured to said chamber *means* so that said head piece may rotate relative to said chamber *means* without axial movement of said head piece relative to said chamber *means* to cause said electrical coupling means to selectively electrically couple said chamber *means* and said lamp holder *means*; and (f) a bezel that is rotatably secured to said head piece so that said bezel may rotate relative to said chamber *means* without axial movement of said bezel relative to said head piece to cause said reflector to move axially relative to said lamp.

*13. A flashlight comprising:*

*(a) a chamber for retaining at least one battery;*

*(b) a lamp holder assembly for retaining a lamp, positioned at least partially within said chamber;*

*(c) a head assembly attachable to said chamber for retaining a reflector, wherein rotation of said head assembly causes electrical coupling of said lamp and said battery;*

*(d) a bezel rotatable relative to said chamber, wherein solely radial rotation of said bezel causes the light emanating from said lamp to focus and defocus.*

*14. A flashlight comprising:*

*(a) a chamber for retaining at least one battery;*

*(b) a lamp holder assembly for retaining a lamp, positioned at least partially within said chamber;*

*(c) a head assembly attachable to said chamber for retaining a reflector, said reflector adapted to receive said lamp, wherein rotation of said head assembly causes electrical coupling of said lamp and said battery;*

*(d) a bezel rotatable relative to said chamber and operably connected to said reflector, wherein solely radial rotation of said bezel causes axial movement of said reflector relative to said lamp.*

*15. A flashlight comprising:*

(*a*) *a chamber for retaining at least one battery, said chamber having a first end portion and a second end portion;*

(*b*) *a lamp positioned at said first end portion of said chamber;*

(*c*) *a switch assembly positioned between said lamp and said battery wherein movement of said switch assembly electrically couples said lamp to said battery;*

(*d*) *a reflector adapted to receive said lamp;*

(*e*) *a bezel rotatable relative to said chamber and operably connected to said reflector, wherein solely radial rotation of said bezel causes axial movement of said reflector relative to said lamp.*

*16. A flashlight comprising:*

(*a*) *a chamber for retaining at least one battery, said chamber having a first end portion and a second end portion;*

(*b*) *a lamp positioned at said first end portion of said chamber;*

(*c*) *a head piece attachable to said chamber;*

(*d*) *a reflector adapted to receive said lamp;*

(*e*) *a bezel rotatable relative to said chamber and operably connected to said reflector, wherein rotation of said bezel relative to said chamber causes axial movement of said reflector relative to said lamp, but does not cause axial movement of said bezel relative to said lamp.*

* * * * *